US007798899B2

(12) United States Patent
Acres

(10) Patent No.: US 7,798,899 B2
(45) **Date of Patent: *Sep. 21, 2010**

(54) METHOD AND APPARATUS FOR CONTROLLING THE COST OF PLAYING AN ELECTRONIC GAMING DEVICE

(75) Inventor: John F. Acres, Corvallis, OR (US)

(73) Assignee: IGT, Reno, NV (US)

(*) Notice: Subject to any disclaimer, the term of this patent is extended or adjusted under 35 U.S.C. 154(b) by 623 days.

This patent is subject to a terminal disclaimer.

(21) Appl. No.: 09/878,111

(22) Filed: Jun. 6, 2001

(65) Prior Publication Data

US 2002/0058546 A1 May 16, 2002

Related U.S. Application Data

(60) Continuation of application No. 09/086,964, filed on May 29, 1998, now Pat. No. 6,254,483, which is a continuation of application No. 08/465,717, filed on Jun. 6, 1995, now Pat. No. 5,836,817, which is a division of application No. 08/322,172, filed on Oct. 12, 1994, now Pat. No. 5,655,961.

(51) Int. Cl.
*A63F 13/00* (2006.01)

(52) U.S. Cl. .......................................... 463/29; 463/42

(58) Field of Classification Search .................. 463/16, 463/25, 29, 42, 20

See application file for complete search history.

(56) References Cited

U.S. PATENT DOCUMENTS 3,269,503 A 8/1966 Foster (Continued)

FOREIGN PATENT DOCUMENTS

AU 39363/78 3/1980

(Continued)

OTHER PUBLICATIONS

Report & Recommendation (Findings of Fact & Conclusions of Law Re: Claim Construction), May 2000.

(Continued)

*Primary Examiner*—Peter DungBa Vo
*Assistant Examiner*—O. Deodhar
(74) *Attorney, Agent, or Firm*—Weaver Austin Villeneuve & Sampson LLP

(57) ABSTRACT

Electronic gaming machines, such as slot machines or video poker machines are interconnected by a computer network. The behavior of each machine is controlled by configuring selected parameters such as game speed, payback percentage, or game appearance. As the machines are played, any of the selected parameters may be changed responsive to commands issued over the network. The commands are issued in response to predetermined changes in variables such as rate of play, player status, and the time of the day, week, or month. The payback percentage may be changed by implementing a new pay table at the selected machine or machines or by implementing a bonus period during which a percentage of all money played on the selected machines accrues in a bonus pool. During the bonus period, the selected machines are eligible for bonus awards that may be random or related to jackpots paid based on the pay tables in the selected machines.

9 Claims, 4 Drawing Sheets

U.S. PATENT DOCUMENTS

| | | | | |
|---|---|---|---|---|
| 3,598,964 | A | 8/1971 | Dell | 235/61.6 R |
| 3,659,284 | A | 4/1972 | Rusch | 340/324 A |
| 3,796,433 | A | 3/1974 | Fraley et al. | 273/138 A |
| 3,819,186 | A | 6/1974 | Hinterstocker | 273/138 A |
| 3,906,447 | A | 9/1975 | Crafton et al. | |
| 3,998,309 | A | 12/1976 | Mandas et al. | 194/97 R |
| 4,072,930 | A | 2/1978 | Lucero | 340/152 T |
| 4,230,265 | A | 10/1980 | Casaly | 235/455 |
| 4,238,127 | A | 12/1980 | Lucero et al. | 273/143 R |
| 4,258,838 | A | 3/1981 | Rockola et al. | 194/1 R |
| 4,283,709 | A | 8/1981 | Lucero et al. | 340/147 R |
| 4,332,780 | A | 6/1982 | Rhoda et al. | |
| 4,335,809 | A | 6/1982 | Wain | 194/1 R |
| 4,409,656 | A | 10/1983 | Anderson | 364/200 |
| 4,467,424 | A | 8/1984 | Hedges et al. | 364/412 |
| 4,494,197 | A | 1/1985 | Troy et al. | |
| 4,573,681 | A | 3/1986 | Okada | 273/143 R |
| 4,575,622 | A | 3/1986 | Pellegrini | 235/382 |
| 4,582,324 | A | 4/1986 | Koza et al. | |
| 4,621,188 | A | 11/1986 | Stockburger et al. | |
| 4,624,459 | A | 11/1986 | Kaufman | 273/143 R |
| 4,636,951 | A | 1/1987 | Harlick | 364/412 |
| 4,652,998 | A | 3/1987 | Koza et al. | 364/412 |
| 4,669,596 | A | 6/1987 | Capers et al. | 194/210 |
| 4,669,730 | A | 6/1987 | Small | 273/138 |
| 4,669,731 | A | 6/1987 | Clarke | 273/143 R |
| 4,679,143 | A | 7/1987 | Hagiwara | 364/412 |
| 4,700,296 | A | 10/1987 | Palmer, Jr. et al. | |
| 4,760,247 | A | 7/1988 | Keane et al. | 235/454 |
| 4,760,527 | A | 7/1988 | Sidley | 364/412 |
| 4,764,666 | A | 8/1988 | Bergeron | 235/380 |
| 4,775,937 | A | 10/1988 | Bell | 364/412 |
| 4,805,907 | A | 2/1989 | Hagiwara | 273/138 A |
| 4,815,741 | A | 3/1989 | Small | 273/138 A |
| 4,837,728 | A | 6/1989 | Barrie et al. | 364/412 |
| 4,839,640 | A | 6/1989 | Ozer et al. | 340/825.31 |
| 4,842,278 | A | 6/1989 | Markowicz | |
| 4,844,464 | A | 7/1989 | Berge | |
| 4,856,787 | A | 8/1989 | Itkis | |
| 4,861,041 | A | 8/1989 | Jones et al. | |
| 4,871,171 | A | 10/1989 | Rivero | 273/138 A |
| 4,880,237 | A | 11/1989 | Kishishita | 273/138 A |
| 4,882,473 | A | 11/1989 | Bergeron et al. | 235/380 |
| 4,922,420 | A | 5/1990 | Nakagawa et al. | |
| 4,926,327 | A | 5/1990 | Sidley | 364/412 |
| 4,926,996 | A | 5/1990 | Eglise et al. | |
| 4,948,134 | A | 8/1990 | Suttle et al. | |
| 4,948,138 | A | 8/1990 | Pease et al. | |
| 4,964,638 | A | 10/1990 | Ishida | 273/138 A |
| 4,991,848 | A | 2/1991 | Greenwood et al. | 273/143 R |
| 5,007,649 | A | 4/1991 | Richardson | 273/237 |
| 5,016,880 | A | 5/1991 | Berge | |
| 5,038,022 | A | 8/1991 | Lucero | 235/380 |
| 5,042,810 | A | 8/1991 | Williams | 273/142 |
| 5,043,887 | A | 8/1991 | Richardson | |
| 5,046,736 | A | 9/1991 | Bridgeman et al. | |
| 5,048,833 | A | 9/1991 | Lamle | 273/138 A |
| 5,072,381 | A | 12/1991 | Richardson et al. | |
| 5,074,559 | A | 12/1991 | Okada | 273/143 R |
| 5,078,405 | A | 1/1992 | Jones | 273/309 |
| 5,096,195 | A | 3/1992 | Gimmon | 273/138 A |
| 5,103,081 | A | 4/1992 | Fisher et al. | 235/464 |
| 5,116,055 | A | 5/1992 | Tracy | 273/138 A |
| 5,123,649 | A | 6/1992 | Tiberio | 273/143 R |
| 5,129,652 | A | 7/1992 | Wilkinson | 273/139 |
| 5,135,224 | A | 8/1992 | Yamamoto et al. | 273/143 R |
| 5,152,529 | A | 10/1992 | Okada | |
| 5,159,549 | A | 10/1992 | Hallman, Jr. et al. | |
| 5,178,390 | A | 1/1993 | Okada | 273/143 |
| 5,179,517 | A | 1/1993 | Sarbin et al. | 364/410 |
| 5,185,798 | A | 2/1993 | Hamada et al. | |
| 5,197,094 | A | 3/1993 | Tillery et al. | 379/91 |
| 5,202,549 | A | 4/1993 | Decker et al. | |
| 5,216,613 | A | 6/1993 | Head, III | 369/275.2 |
| 5,217,224 | A | 6/1993 | Sincock | 273/138 A |
| 5,224,706 | A | 7/1993 | Bridgeman et al. | |
| 5,242,163 | A | 9/1993 | Fulton | 273/85 CP |
| 5,249,800 | A | 10/1993 | Hilgendorf et al. | 273/138 A |
| 5,257,179 | A | 10/1993 | DeMar | 364/410 |
| 5,259,616 | A | 11/1993 | Bergmann | 273/138 A |
| 5,265,874 | A | 11/1993 | Dickinson et al. | 273/138 A |
| 5,275,400 | A | 1/1994 | Weingardt et al. | 273/85 CP |
| 5,280,909 | A | 1/1994 | Tracy | 273/138 A |
| 5,286,023 | A | 2/1994 | Wood | |
| 5,287,269 | A | 2/1994 | Dorrough et al. | 364/408 |
| 5,288,077 | A | 2/1994 | Jones | |
| 5,290,033 | A | 3/1994 | Bittner et al. | |
| 5,292,127 | A | 3/1994 | Kelly et al. | 273/138 R |
| 5,321,241 | A | 6/1994 | Craine | |
| 5,324,035 | A | 6/1994 | Morris et al. | 273/138 |
| 5,326,104 | A | 7/1994 | Pease et al. | 273/138 A |
| 5,332,219 | A | 7/1994 | Marnell, II et al. | |
| 5,342,049 | A | 8/1994 | Wichinsky et al. | 273/119 R |
| 5,344,144 | A | 9/1994 | Canon | 273/138 A |
| 5,345,379 | A | 9/1994 | Brous et al. | 364/146 |
| 5,351,970 | A | 10/1994 | Fioretti | |
| 5,359,510 | A | 10/1994 | Sabaliauskas | |
| 5,364,104 | A | 11/1994 | Jones et al. | |
| 5,364,105 | A | 11/1994 | Jones et al. | |
| 5,370,306 | A | 12/1994 | Schulze et al. | 273/138 A |
| 5,370,399 | A | 12/1994 | Liverance | |
| 5,371,345 | A | 12/1994 | LeStrange et al. | 235/380 |
| 5,393,057 | A | 2/1995 | Marnell, II | 273/85 CP |
| 5,398,932 | A | 3/1995 | Eberhardt et al. | |
| 5,401,023 | A | 3/1995 | Wood | |
| 5,401,024 | A | 3/1995 | Simunek | |
| 5,410,590 | A | 4/1995 | Blood et al. | |
| 5,423,539 | A | 6/1995 | Nagao | 273/143 R |
| 5,429,361 | A | 7/1995 | Raven et al. | 273/138 A |
| 5,470,079 | A | 11/1995 | LeStrange et al. | 273/138 A |
| 5,472,194 | A | 12/1995 | Breeding et al. | |
| 5,473,144 | A | 12/1995 | Mathurin, Jr. | 235/380 |
| 5,476,259 | A | 12/1995 | Weingardt | 273/85 |
| 5,477,040 | A | 12/1995 | Lalonde | 235/380 |
| 5,488,411 | A | 1/1996 | Lewis | |
| 5,494,287 | A | 2/1996 | Manz | 273/143 |
| 5,505,461 | A | 4/1996 | Bell et al. | |
| 5,507,489 | A | 4/1996 | Reibel et al. | |
| 5,511,781 | A | 4/1996 | Wood et al. | |
| 5,524,888 | A | 6/1996 | Heidel | |
| 5,533,727 | A | 7/1996 | DeMar | 463/23 |
| 5,536,016 | A | 7/1996 | Thompson | 273/269 |
| 5,542,669 | A | 8/1996 | Charron et al. | |
| 5,544,893 | A | 8/1996 | Jones et al. | |
| 5,547,192 | A | 8/1996 | Ishibashi | 463/26 |
| 5,550,359 | A | 8/1996 | Bennett | 235/382 |
| 5,551,692 | A | 9/1996 | Pettitt et al. | 273/143 R |
| 5,557,086 | A * | 9/1996 | Schulze et al. | 235/380 |
| 5,559,312 | A | 9/1996 | Lucero | 235/380 |
| 5,564,700 | A | 10/1996 | Celona | 463/27 |
| 5,570,885 | A | 11/1996 | Ornstein | 463/27 |
| 5,577,959 | A | 11/1996 | Takemoto et al. | 463/25 |
| 5,580,309 | A | 12/1996 | Piechowiak et al. | 463/16 |
| 5,580,310 | A | 12/1996 | Orus et al. | 463/16 |
| 5,586,936 | A | 12/1996 | Bennett et al. | 463/25 |
| 5,586,937 | A | 12/1996 | Menashe | |
| 5,603,659 | A | 2/1997 | Okada | |
| 5,611,535 | A | 3/1997 | Tiberio | |
| 5,611,730 | A | 3/1997 | Weiss | 463/20 |
| 5,635,696 | A | 6/1997 | Dabrowski | |
| 5,645,486 | A | 7/1997 | Nagao et al. | |
| 5,651,057 | A | 7/1997 | Blood et al. | |
| 5,655,961 | A * | 8/1997 | Acres et al. | 463/27 |
| 5,661,535 | A | 8/1997 | Wang | 273/143 |

| | | | | |
|---|---|---|---|---|
| 5,668,950 A | 9/1997 | Kikuchi et al. | 395/200.47 |
| 5,674,128 A | 10/1997 | Holch et al. | 463/42 |
| 5,702,304 A | 12/1997 | Acres et al. | 463/29 |
| 5,722,891 A | 3/1998 | Inoue | 463/20 |
| 5,741,183 A | 4/1998 | Acres et al. | 463/42 |
| 5,743,523 A | 4/1998 | Kelly et al. | 273/138.1 |
| 5,752,882 A | 5/1998 | Acres et al. | 463/42 |
| 5,758,875 A | 6/1998 | Giacalone, Jr. | 273/143 R |
| 5,759,102 A | 6/1998 | Pease | |
| 5,761,647 A | 6/1998 | Boushy | 705/10 |
| 5,762,552 A | 6/1998 | Vuong et al. | |
| 5,766,076 A | 6/1998 | Pease et al. | 463/27 |
| 5,770,533 A * | 6/1998 | Franchi | 463/16 |
| 5,772,509 A | 6/1998 | Weiss | |
| 5,779,545 A | 7/1998 | Berg et al. | |
| 5,779,547 A | 7/1998 | SoRelle et al. | 463/28 |
| 5,779,549 A | 7/1998 | Walker | |
| 5,800,269 A | 9/1998 | Holch et al. | |
| 5,811,772 A | 9/1998 | Lucero | 235/380 |
| 5,816,917 A | 10/1998 | Kelmer et al. | 463/16 |
| 5,816,918 A | 10/1998 | Kelly et al. | 463/16 |
| 5,820,459 A | 10/1998 | Acres et al. | 463/25 |
| 5,823,874 A | 10/1998 | Adams | |
| 5,833,538 A | 11/1998 | Weiss | |
| 5,833,540 A | 11/1998 | Miodunski et al. | 463/42 |
| 5,836,817 A | 11/1998 | Acres et al. | 463/26 |
| 5,839,956 A | 11/1998 | Takemoto | 463/25 |
| 5,848,932 A | 12/1998 | Adams | |
| 5,851,148 A | 12/1998 | Brune et al. | 463/25 |
| 5,851,149 A | 12/1998 | Xidos et al. | 463/42 |
| 5,852,306 A | 12/1998 | Forbes | |
| 5,854,542 A | 12/1998 | Forbes | 315/291 |
| 5,855,515 A | 1/1999 | Pease et al. | |
| 5,876,284 A | 3/1999 | Acres et al. | |
| 5,882,261 A | 3/1999 | Adams | |
| 5,902,983 A | 5/1999 | Crevelt et al. | 235/380 |
| 5,917,725 A | 6/1999 | Thacher | |
| 5,919,091 A | 7/1999 | Bell et al. | 463/25 |
| 5,941,773 A | 8/1999 | Harlick | |
| 5,984,779 A | 11/1999 | Bridgeman et al. | 463/16 |
| 6,001,016 A | 12/1999 | Walker et al. | |
| 6,012,982 A | 1/2000 | Piechowiak et al. | 463/16 |
| 6,012,983 A | 1/2000 | Walker | |
| 6,039,648 A | 3/2000 | Guinn et al. | 463/16 |
| 6,048,269 A | 4/2000 | Burns et al. | 463/25 |
| 6,050,895 A | 4/2000 | Luciano, Jr. et al. | |
| 6,059,659 A | 5/2000 | Busch et al. | |
| 6,068,552 A | 5/2000 | Walker | |
| 6,068,553 A | 5/2000 | Parker | |
| 6,071,190 A | 6/2000 | Weiss et al. | |
| 6,077,162 A | 6/2000 | Weiss | 463/26 |
| 6,080,062 A | 6/2000 | Olson | 463/42 |
| 6,082,887 A | 7/2000 | Feuer et al. | |
| 6,089,980 A | 7/2000 | Gauselmann | |
| 6,099,408 A | 8/2000 | Schneier et al. | |
| 6,110,041 A | 8/2000 | Walker | |
| 6,110,043 A * | 8/2000 | Olsen | 463/27 |
| 6,113,493 A * | 9/2000 | Walker et al. | 463/25 |
| 6,117,011 A | 9/2000 | Lvov | |
| 6,126,542 A | 10/2000 | Fier | |
| 6,135,884 A * | 10/2000 | Hedrick et al. | 463/20 |
| 6,142,872 A | 11/2000 | Walker et al. | |
| 6,146,273 A * | 11/2000 | Olsen | 463/27 |
| 6,162,122 A | 12/2000 | Acres et al. | |
| 6,179,711 B1 | 1/2001 | Yoseloff | |
| 6,190,255 B1 | 2/2001 | Thomas et al. | |
| 6,219,836 B1 | 4/2001 | Wells et al. | |
| 6,224,484 B1 | 5/2001 | Okuda et al. | |
| 6,234,896 B1 | 5/2001 | Walker | |
| 6,238,288 B1 | 5/2001 | Walker | |
| 6,244,958 B1 | 6/2001 | Acres | |
| 6,257,981 B1 | 7/2001 | Acres | |
| 6,264,557 B1 | 7/2001 | Schneier et al. | |
| 6,287,202 B1 | 9/2001 | Pascal et al. | 463/42 |
| 6,293,866 B1 | 9/2001 | Walker et al. | |
| 6,302,790 B1 | 10/2001 | Brossard | |
| 6,302,793 B1 | 10/2001 | Fertitta, III | |
| 6,312,333 B1 | 11/2001 | Acres et al. | |
| 6,364,769 B1 | 4/2002 | Weiss et al. | |
| 6,371,852 B1 | 4/2002 | Acres | |
| 6,375,569 B1 | 4/2002 | Acres | |
| 6,460,848 B1 | 10/2002 | Soltys et al. | |
| 6,511,376 B2 | 1/2003 | Walker et al. | 463/21 |
| 6,589,115 B2 | 7/2003 | Walker et al. | 463/25 |
| 6,592,460 B2 | 7/2003 | Torango | |
| 6,620,046 B2 | 9/2003 | Rowe | |
| 7,056,215 B1 | 6/2006 | Olive | |
| 7,077,746 B2 | 7/2006 | Torango et al. | |
| 7,108,603 B2 | 9/2006 | Olive | |
| 2001/0055990 A1 | 12/2001 | Acres et al. | |
| 2003/0228904 A1 | 12/2003 | Acres et al. | |
| 2005/0032573 A1 | 2/2005 | Acres et al. | |
| 2005/0101374 A1 | 5/2005 | Acres | |
| 2007/0032301 A1 | 2/2007 | Acres et al. | |

FOREIGN PATENT DOCUMENTS

| | | |
|---|---|---|
| AU | 66683/81 | 8/1981 |
| AU | B-27572/84 | 11/1984 |
| AU | 589158 | 8/1986 |
| AU | B 53370/86 | 8/1986 |
| AU | 555905 | 10/1986 |
| AU | 567001 | 11/1987 |
| AU | 585160 | 6/1989 |
| AU | 593059 | 2/1990 |
| AU | 71194/91 | 8/1991 |
| AU | B-71194/91 | 8/1991 |
| AU | B-77519/91 | 11/1991 |
| AU | 647234 | 7/1992 |
| AU | B 10488/92 | 7/1992 |
| AU | B-10488/92 | 7/1992 |
| AU | B 13023/92 | 9/1992 |
| AU | 199220986 | 1/1993 |
| AU | B-20986/92 | 1/1993 |
| AU | 57333/94 | 6/1994 |
| AU | 680920 | 8/1995 |
| AU | 655801 | 9/1995 |
| AU | 21618/95 | 1/1996 |
| AU | 702021 | 1/1996 |
| AU | P0 7780 | 7/1997 |
| AU | P0 9090 | 9/1997 |
| AU | PO 9102 | 9/1997 |
| AU | 686824 | 2/1998 |
| AU | 722107 | 5/1998 |
| AU | A 48323/97 | 6/1998 |
| AU | 754689 | 2/1999 |
| AU | 728788 | 7/1999 |
| AU | 649009 | 8/1999 |
| AU | 716421 | 8/1999 |
| AU | 716422 | 8/1999 |
| AU | 716547 | 8/1999 |
| AU | 716548 | 8/1999 |
| AU | 63152/99 | 12/1999 |
| AU | 755692 | 4/2000 |
| AU | 756492 | 4/2000 |
| AU | 751088 | 12/2000 |
| AU | 697582 | 4/2001 |
| AU | 733963 | 9/2001 |
| AU | 766341 | 1/2002 |
| AU | 750775 | 7/2002 |
| AU | 754444 | 3/2003 |
| AU | 757903 | 6/2003 |
| AU | 2006203564 | 8/2006 |
| AU | 2006203638 | 9/2006 |
| AU | 2003200581 | 11/2006 |
| AU | 2007200572 | 2/2007 |

| | | | |
|---|---|---|---|
| AU | 2007201195 | | 3/2007 |
| AU | 2002317546 | | 5/2007 |
| AU | 2003204730 | | 6/2007 |
| CA | 2443301 | | 4/1998 |
| CA | 2049776 | | 5/1999 |
| CA | 2272499 | | 12/2002 |
| CA | 2234681 | | 12/2003 |
| CA | 2442444 | | 1/2006 |
| CA | 2442442 | | 3/2007 |
| DE | 3415114 | | 10/1985 |
| DE | 19701214 | | 7/1998 |
| EP | 0 444 932 | | 10/1995 |
| EP | 0770415 | | 5/1997 |
| GB | 1242298 | | 8/1971 |
| GB | 1284898 | | 8/1972 |
| GB | 2083936 | | 3/1982 |
| GB | 2099198 | | 12/1982 |
| GB | 2 151 054 | A | 7/1985 |
| GB | 2169737 | | 7/1986 |
| GB | 2180087 | | 3/1987 |
| GB | 2191030 | | 12/1987 |
| GB | 2 211 975 | A | 7/1989 |
| GB | 2211975 | A | 7/1989 |
| GB | 2230373 | | 10/1990 |
| GB | 2262642 | | 6/1993 |
| JP | 62269548 | | 11/1987 |
| JP | 62275372 | | 11/1987 |
| JP | 5184709 | | 7/1993 |
| JP | 6079055 | | 3/1994 |
| JP | 6246068 | | 9/1994 |
| JP | 6335560 | | 12/1994 |
| JP | 09192289 | | 7/1997 |
| JP | 09248384 | | 9/1997 |
| JP | 10033829 | | 2/1998 |
| NZ | 330189 | | 7/2000 |
| NZ | 500706 | | 8/2000 |
| WO | WO 80/02512 | | 11/1980 |
| WO | WO94/12256 | | 6/1994 |
| WO | WO95/22811 | | 8/1995 |
| WO | WO95/30944 | | 11/1995 |
| WO | WO 96/08295 | | 3/1996 |
| WO | WO97/02872 | | 7/1996 |
| WO | WO96/37866 | | 11/1996 |
| WO | WO 9712315 | | 4/1997 |
| WO | WO 9807484 | | 2/1998 |
| WO | WO 9818532 | | 5/1998 |
| WO | WO98/35309 | | 8/1998 |
| WO | WO98/40140 | | 9/1998 |
| ZA | 98/3158 | | 10/1999 |
| ZA | 99/3643 | | 2/2000 |

OTHER PUBLICATIONS

Expert Report of Michael J. Bennett Pursuant to Fed. R. Civ. p. 26(A(2) (sic), Feb. 1999.

Expert Report of Michael J. Bennett Pursuant to Fed. R. Civ. p. 26(A)(2), Jul. 1999.

Expert Witness Report of Leroy A. Prohofsky, Feb. 1999.

Expert Witness Report of Leroy A. Prohofsky, Jun. 1999.

Supplememt to Expert Witness Reports of Leroy A. Prohofsky, Jun. 1999.

Second Supplement to Expert Witness Reports of Leroy A. Prohofsky, Sep. 1999.

Rebuttal Statement by Expert Witness William K. Bertram, Ph.D., Mar. 1999.

Rebuttal Statement by Expert Witness John F. Acres, Jul. 1999.

Rebuttal Statement by Expert Witness William K. Bertram, Ph.D., Jul 1999.

Expert Witness Report of R. Franklin Burnett, Jun. 1999.

Rebuttal Statement by Expert Witness Thomas F. Smegal, Jr., Jul. 1999.

CDS' Third Motion and Memorandum of Points and Authorities in Support of CDS' Motion for Summary Judgement of Invalidity of U.S. Patent No. 5,752,882 (On-Sale Bar).

Exihibits in Support of CDS' Third Motion and Memorandum of Points and Authorities in Support of CDS' Motion for Summary Judgement of Invalidity of U.S. Patent No. 5,752,882 (On-Sale Bar).

Acres Gaming's Opposition to CDS's Third Motion for Summary Judgment of Invalidity of U.S. Patent No. 5,752,882 (On-Sale Bar).

Deposition of Jose Vega Dated Jan. 25, 1999 with Exhibit Nos. 191, 193, 194, 195, 197, 198.

CDS Motion and Memorandum of Points and Authorities in Support of CDS' Motion for Summary Judgment of Invalidity of US Patent No. 5,752,882 (On-Sale Bar) [Filed Under Seal—Subject to Protective Order].

Proposed Findings of Facts in Support of CDS' Memorandum of Points and Authorities in Support of CDS' Third Motion for Summary Judgment of Invalidity of U.S. Patent No. 5,752,882 (On-Sale Bar) [Filed Under Seal—Subject to Protective Order]; and.

Exhibits in Support of CDS' Motion and Memorandum of Points and Authorities in Support of CDS' Motion for Summary Judgment of Invalidity of U.S. Patent No. 5,752,882 (On-Sale Bar), with Affidavit of Gregory C. Schodde [Filed Under Seal—Subject to Protective Order].

R. Stäuble, MPL 4215 Interface, Oct.1991, pp. 1-16.

Byte, Hardware/Software Showcase, Dec. 1992, p. 308.

Inder S. Gopal and Adrian Segall, IEEE Transactions on Communications, "Dynamic Address Assignment in Broadcast Networks," Jan. 1986, vol. Com-34, No. 1, pp. 32-37.

Fred Swainston, A Systems Approach to Programmable Controllers, 1992, pp. ix-226.

Acres Gaming Incorporated Form SB-2 filed with the Securities and Exchange Commission on Sep. 20, 1993.

Excerpt from Mikohn, "Product Catalog," Chapters 1, 2, 6, 7, and 8, 64 pgs. (Jan. 1993).

Excerpt from Mikohn, "Super Controller Manual," Chapters 1-3 and 6-7, 207 pgs. (1989).

Casino Data Systems, "ProLINK Progressive Controller: User/Reference Manual," 38 pgs. (Apr. 1997).

Bueschel, *Lemons, Cherries and Bell-Fruit Gum*, pp. 1-4, 304-314 (Royal Bell Books, Nov. 1995).

GRIPS International, "Wide Area Progressive Link System" (website reported as archived Feb. 20, 1997) (available at http://web.archive.org/web/19970220165457/www.grips.com/wap.htm).

GRIPS International, "Integrated Real Time On-Line Slot System - SDI" Website reported as archived Feb. 20, 1997) (available at http://web.archive.org/web/19970220165559/www.grips.com/sdi.htm).

GRIPS International, "PEM—Precision Electronic Meter" (website reported as archived Feb. 20, 1997) (available at http://web.archive.org/web/19970220165753/www.grips.com/pem.htm).

GRIPS International, "Player Tracking on Slots" (website reported as archived Feb. 20, 1997) (available at http://web.archive.org/web/19970220165921/www.grips.com/playtrac.htm).

"FAST BUCK Systems Manual," 52 pgs. (available to Mirage shift supervisors at least as early as May 30, 1990).

Aristocrat, "Catalogue of Champions," 4 pgs. (1990).

Aristocrat Buyer's Guide with ACES A, 2 pp. (Mar.-May 1989).

Aristocrat IDS dated Mar. 8, 2005, filed in U.S. Appl. No. 09/462,717, and referring to Surprize Gaming Machine.

Surprize Gaming Machine Advertisement, Aristocrat Leisure Industries, Australia.

"Surprize Software Specification for MV2030—var 01", Aristocrat Leisure Industries, Australia.

U.S. Appl. No. 60/035,513, filed Jan. 15, 1997, Torango et al.

U.S. Appl. No. 60/040,982, filed Mar. 17, 1997, Torango et al.

U.S. Appl. No. 60/050,971, filed Jun. 19, 1997, Torango et al.

U.S. Appl. No. 60/083,299, filed May 28, 1998, John F. Acres.

Atronic Casino Technology, Action Jackpot Brochure.

Atronic Casino Technology, "Action Jackpot," in *Casino Journal*, (Oct. 1996).

Australia/New Zealand Gaming Machine National Standards, Revision 1.0, 127 pp. (Dec. 1997).

Bueschel, *Lemons, Cherries and Bell-Fruit-Gum*, 346 pp. (Royal Bell Books, Nov. 1995).

Information Disclosure Statement and Form 1449 submitted by Aristocrat Leisure Industries Pty Ltd. on Apr. 16, 2007, in U.S. Appl. No. 11/365,007.
Information Disclosure Statement and Form 1449 submitted by Aristocrat Leisure Industries Pty Ltd. on Apr. 16, 2007, in U.S. Appl. No. 11/365,177.
Information Disclosure Statement and Form 1449 submitted by Aristocrat Leisure Industries Pty Ltd. on Apr. 16, 2007, in U.S. Appl. No. 11/445,969.
Exhibit A Cited in Information Disclosure Statements dated Apr. 16, 2007, submitted in U.S. Appl. Nos. 11/365,007, 11/365,177, and 11/445,969, entitled "Documents related to the Surprize game".
Exhibit B Cited in Information Disclosure Statements dated Apr. 16, 2007, submitted in U.S. Appl. Nos. 11/365,007, 11/365,177, and 11/445,969, entitled "Documents related to the Surprize (MV2030) game".
Exhibit C Cited in Information Disclosure Statements dated Apr. 16, 2007, submitted in U.S. Appl. Nos. 11/365,007, 11/365,177, and 11/445,969, entitled "Documents related to the Fast Buck game".
Exhibit D Cited in Information Disclosure Statements dated Apr. 16, 2007, submitted in U.S. Appl. Nos. 11/365,007, 11/365,177, and 11/445,969, entitled "Documents related to Down-loaded System Awards Regulations".
Exhibit E Cited in Information Disclosure Statements dated Apr. 16, 2007, submitted in U.S. Appl. Nos. 11/365,007, 11/365,177, and 11/445,969, entitled "Documents related to the ACES game".
Exhibit F Cited in Information Disclosure Statements dated Apr. 16, 2007, submitted in U.S. Appl. Nos. 11/365,007, 11/365,177, and 11/445,969, entitled "Documents related to the Best-and-Fairest game".
Exhibit G Cited in Information Disclosure Statements dated Apr. 16, 2007, submitted in U.S. Appl. Nos. 11/365,007, 11/365,177, and 11/445,969, entitled "Documents related to the Cricketer game".
Exhibit H Cited in Information Disclosure Statements dated Apr. 16, 2007, submitted in U.S. Appl. Nos. 11/365,007, 11/365,177, and 11/445,969, entitled "Documents related to the Thrillions game".
Faust, "The Future of Slots," *Gaming Products & Services*, 8 pp. (Oct. 1995).
Fey, *Slot Machines: A Pictorial History of the First 100 Years*, Fouth Edition, 261 pp. (1994).
Legato, "Aristocrat Leisure Industries," *Casino Journal*, vol. 10, No. 1, pp. 87-89 (Jan. 1997).
Legato, "Atronic Casino Technology," *Casino Journal*, vol. 10, No. 9, 3 pp. (Sep. 1997).
Legato, "World of Slots," Casino Journal, vol. 9, No. 10, pp. 70-98, 145-146 (Oct. 1996).
Legato, "World of Slots," Casino Journal, vol. 10, No. 10, 36 pp. (Oct. 1997).
Mikohn Press Release, "New York - New York Hotel & Casino Unveils New MONEYTIME Slot Jackpot Spectacular From Mikohn," 2 pp. (Jul. 16, 1997).
"New Products and Services" Excerpt from *Gaming Products & Services* (Sep. 1997).
New South Wales, "Approved Poker Machines - Policy, Game Characteristics, Statistical Characteristics," vol. 1, Sec. 1, 88 pp. (Mar. 1995).
New South Wales, "Linked Progressive Jackpot Systems - Guidelines," vol. 3, Sec. 1, 61 pp. (Mar. 1995).
Queensland Treasury Office of Gaming Regulation, "Local Area Electronic Gaming Machine Communication Protocol, Version 1.2," 64 pp. (Mar. 26, 1997).
Queensland Treasury Office of Gaming Regulation, "Local Area Electronic Gaming Machine Communications Protocol, QCOM Version 1.5," 77 pp. (Feb. 26, 1998).
Rutherford, "The Power of the Progressive," *Casino Journal*, 6 pp. (Apr. 1998).
Victorian Casino and Gaming Authority, "Review of VCGA SRD for Gaming Equipment (Version 4.0) with Regard to Gaming Machine National Standards (Revision 1.0)," 72 pp. (Dec. 1997).
Victorian Casino and Gaming Authority, "Technical Requirements for Gaming Machines and Electronic Monitoring Systems in the Melbourne Casino," Version 3.0, 84 pp. (Jul. 10, 1996).
Derb Day Ad by Atronic Casino Technology (1996).
U.S. Appl. No. 09/373,034, filed Aug. 11, 1999, Acres et al.
U.S. Appl. No. 09/572,749, filed May 16, 2000, Acres et al.
Australian Office Action dated Jul. 10, 1998 issued in AU48478-97.
Australian Office Action dated Apr. 17, 2001 issued in AU61905-98.
Australian Office Action dated Dec. 15, 2000 issued in AU63152-99.
Australian Office Action dated Dec. 14, 2000 issued in 32346/99.
Australian Office Action dated Sep. 11, 2002 issued in AU 32346/99.
Australian Office Action dated Oct. 22, 2004 issued in AU 2003200581.
Australian Office Action dated Nov. 23, 2004 issued in AU 2002317546.
Australian Office Action dated May 10, 2005 issued in 2003204730.
Canadian Office Action dated Jul. 20, 2004 issued in CA 2,442,444.
Canadian Office Action dated Dec. 30, 2003 issued in CA 2,442,444.
Canadian Office Action dated Jun. 7, 2004 issued in CA 2,442,442.
Canadian Office Action dated Jan. 26, 2004issued in CA 2,442,442.
Canadian Office Action dated Jun. 10, 2005 issued in CA 2442442.
Canadian Office Action dated Sep. 5, 2006 issued in CA 2,443,301.
Canadian Office Action dated Aug. 29, 2005 issued in CA 2,443,301.
Canadian Office Action dated Aug. 31, 2004 issued in CA 2,443,301.
Canadian Office Action dated Dec. 7, 2001 issued in CA 2,272,499.
New Zealand Office Action dated Mar. 8, 1999 issued in 330189.
New Zealand Office Action dated May 22, 1998 issued in 330189.
US Office Action dated Sep. 27, 1995 issued in U.S. Appl. No. 08/322,172 (5655961).
US Office Action dated Apr. 25, 1996 issued in U.S. Appl. No. 08/322,172.
Notice of Allowance and Allowed Claims dated Aug. 26, 1996 in U.S. Appl. No. 08/322,172.
US Office Action dated Sep. 16, 1996 issued in U.S. Appl. No. 08/465,717 (5836817).
US Office Action dated Jun. 24, 1997 issued in U.S. Appl. No. 08/465,717.
US Office Action dated Apr. 14, 1998 issued in U.S. Appl. No. 08/465,717.
Notice of Allowance and Allowed Claims dated Apr. 28, 1998 in 08/465,717.
US Office Action dated Aug. 4, 1998 issued in U.S. Appl. No. 08/922,046 (6257981).
Notice of Allowance dated Mar. 29, 1999 in U.S. Appl. No. 08/922,046.
US Office Action dated Apr. 25, 2000 issued in U.S. Appl. No. 08/922,046.
Notice of Allowance and Allowed Claims dated Jan. 16, 2001 in U.S. Appl. No. 08/922,046.
US Office Action dated Aug. 13, 1996 issued in 08,465,942 (5741183).
US Final Office Action dated Jun. 9, 1997 issued in 08,465,942.
Notice of Allowance and Allowed Claims dated Nov. 19, 1997 in 08,465,942.
US Final Office Action dated Sep. 18, 1996 issued in 08,467,072.
Notice of Allowance and Allowed Claims issued Jun. 10, 1997 in 08,467,072.
US Office Action dated Aug. 14, 1996 issued in U.S. Appl. No. 08/467,793 (5820459).
US Office Action Final dated Jun. 9, 1997 issued in U.S. Appl. No. 08/467,793 (5820459).
Notice of Allowance dated Feb. 17, 1998 issued in U.S. Appl. No. 08/467,793 (5820459).
US Office Action dated Mar. 18, 1999 issued in U.S. Appl. No. 08/998,285 (6162122).
US Office Action dated Dec. 10, 1999 issued in U.S. Appl. No. 08/998,285.
Notice of Allowance and Allowed Claims issued Jun. 29, 2000 in U.S. Appl. No. 08/998,285.
US Office Action dated Aug. 13, 1996 issued in U.S. Appl. No. 08/465,915 (5752882).
US Office Action dated Jun. 9, 1997 issued in U.S. Appl. No. 08/465,915.
Notice of Allowance and Allowed Claims dated Jun. 5, 1998 in U.S. Appl. No. 08/465,915.
US Office Action dated Apr. 17, 2003 issued in U.S. Appl. No. 09/572,749.

US Office Action dated Jan. 13, 2004 issued in U.S. Appl. No. 09/572,749.
US Office Action Final dated Jun. 30, 2005 issued in U.S. Appl. No. 09/572,749.
US Office Action dated Mar. 31, 2006 issued in U.S. Appl. No. 09/572,749.
US Office Action dated Aug. 20, 1998 issued in U.S. Appl. No. 09/086,964 (6254483).
US Office Action dated Apr. 14, 1999 issued in U.S. Appl. No. 09/086,964.
US Office Action dated May 11, 1999 issued in U.S. Appl. No. 09/086,964.
US Office Action dated Jul. 14, 2000 issued in U.S. Appl. No. 09/086,964.
Notice of Allowance and Allowed Claims dated Nov. 17, 2000 in U.S. Appl. No. 09/086,964.
US Office Action dated Jan. 22, 1999 issued in U.S. Appl. No. 08/843,411 (6319125).
US Office Action dated Aug. 25, 1999 issued in U.S. Appl. No. 08/843,411.
US Office Action dated Jul. 14, 2000 issued in U.S. Appl. No. 08/843,411.
Notice of Allowance and Allowed Claims dated Mar. 9, 2001 in U.S. Appl. No. 08/843,411.
Notice of Allowance and Allowed Claims dated Mar. 21, 2001 in U.S. Appl. No. 08/843,411.
US Office Action dated Jan. 7, 2004 issued in U.S. Appl. No. 10/366,036.
US Final Office Action dated Jul. 21, 2004 issued in U.S. Appl. No. 10/366,036.
Notice of Allowance and Allowed Claims dated Feb. 25, 2005 in U.S. Appl. No. 10/366,036.
US Office Action dated Aug. 6, 2002 issued in U.S. Appl. No. 09/827,870.
US Office Action dated Jan. 29, 2003 issued in U.S. Appl. No. 09/827,870.
US Office Action dated Jan. 12, 2004 issued in U.S. Appl. No. 09/827,870.
Notice of Allowance dated Jul. 11, 2008 issued in U.S. Appl. No. 09/827,870.
US Office Action dated Sep. 26, 2003 issued in U.S. Appl. No. 09/574,632.
US Final Office Action dated May 5, 2004 issued in U.S. Appl. No. 09/574,632.
Notice of Allowance and Allowed Claims dated Aug. 4, 2004 in U.S. Appl. No. 09/574,632.
Notice of Allowance and Allowed Claims dated Oct. 29, 2004 in U.S. Appl. No. 09/574,632.
US Office Action dated Mar. 12, 2007 issued in U.S. Appl. No. 10/932,615.
US Office Action dated Aug. 6, 2007 issued in U.S. Appl. No. 10/932,615.
US Office Action Final dated Feb. 13, 2008 issued in U.S. Appl. No. 10/932,615.
US Office Action dated May 23, 2006 issued in U.S. Appl. No. 11/118,163.
US Office Action dated May 5, 2007 issued in U.S. Appl. No. 11/118,163.
US Office Action dated Sep. 27, 2007 issued in U.S. Appl. No. 11/118,163.
US Office Action dated Apr. 2, 2008 issued in U.S. Appl. No. 11/118,163.
US Office Action dated Apr. 17, 2003 issued in U.S. Appl. No. 09/373,034.
Notice of Allowance dated Jan. 14, 2004 in U.S. Appl. No. 09/373,034.
Notice of Allowance dated Feb. 12, 2007 in U.S. Appl. No. 09/37,3034.
Notice of Allowance dated Jun. 21, 2007 in U.S. Appl. No. 09/373,034.
Notice of Allowance dated Nov. 8, 2007 in U.S. Appl. No. 09/373,034.
Notice of Allowance dated May 2, 2008 in U.S. Appl. No. 09/373,034.
US Office Action dated Oct. 19, 2000 issued in U.S. Appl. No. 09/573,470.
US Office Action dated Jul. 31, 2001 issued in U.S. Appl. No. 09/573,470.
US Office Action dated Oct. 9, 2001 issued in U.S. Appl. No. 09/573,470.
US Office Action dated Apr. 17, 2002 issued in U.S. Appl. No. 09/573,470.
Notice of Allowance dated May 6, 2002 issued in U.S. Appl. No. 09/573,470.
US Office Action dated Mar. 17, 2008 issued in U.S. Appl. No. 11/380,895.
US Office Action dated Apr. 25, 2008 issued in U.S. Appl. No. 11/580,667.
US Office Action - Final dated Jan. 6, 2005 issued in U.S. Appl. Nos. 90/006,655; 90/007,212.
US Office Action dated Jun. 28, 2005 issued in U.S. Appl. Nos. 90/006,655; 90/007,212.
Acres Gaming, Inc.'s Opposition to Casino Data Systems' and Sunset Station Hotel and Casino's Motion for Summary Judgment.
Acres Gaming, Inc.'s Second Supplement to its Opposition to Casino Data Systems' and Sunset Station Hotel and Casino's Motion for Summary Judgment (vol. II).
Acres Gaming, Inc.'s Supplement to its Opposition to Casino Data Systems' and Sunset Station Hotel and Casino's Motion for Summary Judgment (vol. II).
Acres Gaming, Inc.'s Third Supplement to its Opposition to Casino Data System's and Sunset Station Hotel and Casino's Motion for Summary Judgment (vol. II).
Acres Gaming's Opposition to CDS' Motion for Summary Judgment of Invalidity of U.S. Patent No. 5,752,882 (On-Sale Bar) [Filed *Under Seal*—Subject to Protective Order].
Acres Gaming's Opposition to CDS' Motion for Summary Judgment of Invalidity of US Patent No. 5,836,817 (On-Sale Bar) [Filed *Under Seal*—Subject to Protective Order].
Acres' Reponses to CDS' Proposed Findings of Fact Regarding CDS' Motion for Summary Judgment of Invalidity of U.S. Patent No. 5,752,882 (On-Sale Bar) [Filed *Under Seal*—Subject to Protective Order].
Acres' Response to the Proposed Findings of Fact of Casino Data Systems Regarding CDS' Motion for Summary Judgment of Invalidity (vol. II).
Acres' Responses to Proposed Findings of Fact of Casino Data Systems Regarding CDS' Motion for Summary Judgment of Invalidity of US Patent No. 5,836,817 (On-Sale Bar) [Filed *Under Seal*—Subject to Protective Order].
Casino Data Systems and Sunset Hotel & Casino's Evidence in Support of CDS' Motion for Summary Judgment of Invalidity and Opposition to Acres' Motion for Preliminary Injunction ("CDS Exhibits") [Filed *In Camera*—Subject to Protective Order], including Exhibit T, of Acres Gaming Incorporated Form SB-2 filed with the Securities and Exchange Commission on Sep. 20, 1993 (vol. IB).
Casino Data Systems and Sunset Station Hotel & Casino's ("CDS") Motion for Summary Judgment of Invalidity of U.S. Patent No. 5,752,882 (vol. IA).
CDS' Memorandum of Points and Authorities in Support of CDS' Motion for Summary Judgment of Invalidity of U.S. Patent No. 5,752,882 [Filed *In Camera*] (vol. IA).
CDS' Reply Memorandum in Support of CDS' Motion for Summary Judgment of Invalidity of U.S. Patent No. 5,752,882 (On-Sale Bar) [Filed *Under Seal*—Subject to Protective Order (vol. IA).
CDS' Reply Memorandum in Support of CDS' Motion for Summary Judgment of Invalidity of U.S. Patent No. 5,752,882 (On-Sale Bar) [Filed *Under Seal*—Subject to Protective Order (vol. IA).
CDS' Reply Memorandum in Support of CDS' Motion for Summary Judgment of Invalidity of US Patent No. 5,836,817 (On-Sale Bar) [Filed *Under Seal*—Subject to Protective Order].
CDS' Supplemental Brief Regarding CDS' First Motion for Summary Judgment of Invalidity (vol. IA).
*Clubs Now Have a Sporting Chance* (including Aristocrat insert), Slotworld Magazine, vol. 5, No. 6, pp. 16-17 (Jun. 1992).

Aristocrat IDS dated Mar. 8, 2005, filed in U.S. Appl. No. 09/462,717, and referring to Surprize Gaming Machine.
Deposition of Derell M. Jones and Exhibits 618, 619 & 620 (vol. IX).
Deposition of Disclosure and Exhibits (Wismer, Feb. 25, 1999) (vol. IVA).
Deposition of John F. Acres and Exhibits 706 (color copies) 709 & 715 (vol. IX).
Exhibit A of Bally's First Supplemental Responses to IGT's First Set of Interrogatories to Defendants (Nos. 1-3) filed in *IGT* v. *Bally Gaming International, Inc*., et. al., Civil Action No. 06-282 (SLR), U.S. District Court for the District of Delaware.
Exhibit B of Bally's First Supplemental Responses to IGT's First Set of Interrogatories to Defendants (Nos. 1-3) filed in *IGT* v. *Bally Gaming International, Inc*., et. al., Civil Action No. 06-282 (SLR), U.S. District Court for the District of Delaware.
Exhbit D of Bally's First Supplemental Response to IGT's First Set of Interrogotaries in Defendants (Nos. 1-3) file din *IGT* v. *Bally Gaming International, Inc*., et al., Civil Action No. 06-282 (SLR), U.S. District Court for the District of Delaware.
Exhibits (Additional) to Deposition of Disclosure, Inc. (vol. IVB).
Exhibits in Support of CDS' Memorandum of Point and Authorities in Support of CDS' Motion for Summary Judgment of Invalidity of US Patent No. 5,836,817 (On-Sale Bar) [Filed *Under Seal*—Subject to Protective Order].
Expert Report of Samuel Wolff Pursuant to Federal Rule of Civil Procedure 26(a)(2).
Expert Report of W. Alan Jorgensen Pursuant to Federal Rule of Civil Procedure 26(a)(2) (vol. III).
IGT/ACRES P289/AC001 Flowchart.
IGT's Infringement Contentions filed in *IGT* v. *Bally Gaming International, Inc.* et al., Civil Action No. 06-282 (SLR), U.S. District court for the District of Delaware.
Mikohn 1989 Super Controller Manual.
Mikohn Jan. 1993 Product Catalog.
Proposed Findings of Fact in Support of CDS' Memorandum of Points and Authorities in Support of CDS' Third Motion for Summary Judgment of Invalidity of US Patent No. 5,836,817 (On-Sale Bar) [Filed *Under Seal*—Subject to Protective Order].
Transcript of Motion for Summary Judgment of Invalidity of U.S. Patent No. 5,752,882 before the Honorable Howard D. McKibben on Jan. 19, 1999 (Vol. III).
ZWorld, Innovations in Control Technology, Guide to Control Products, 1999.
Australian Office Action dated May 26, 2008 issued in 2007200572.
Notice of Allowance dated Sep. 8, 2008 issued in U.S. Appl. No. 10/932,615.
US Office Action dated Aug. 19, 2008 issued in U.S. Appl. No. 11/380,879.
US Office Action dated Aug. 21, 1997 issued in U.S. Appl. No. 08/647,621 (now 5,876,284).
US Notice of Allowance dated Jun. 3, 1998 issued in U.S. Appl. No. 08/647,621 (now 5,876,284).
CDS' Motion and Memorandum of Point and Authorities in Support of CDS' Motion for Summary Judgment of Invalidity of US Patent No. 5,836,817 (On-Sale Bar) [Filed Under Seal—Subject to Protective Order].
Australian Notice of Acceptance dated Jul. 20, 2006 issued in AU2003200581.
Australian Office Action dated Jul. 2, 1999 issued in AU 716547.
Australian Office Action dated Jul. 2, 1999 issued in AU 716421.
Australian Statement of Grounds and Particulars in Support of Opposition by Aristocrat Leisure Industries dated Aug. 11, 1998 issued in AU27192/95 (AU686824).
Australian Statement of Grounds and Particulars in Support of Opposition by Mikohn Gaming dated Aug. 12, 1998 issued in AU27192/95 (AU686824).
Australian Decision on Opposition dated Nov. 14, 2001 issued in AU27192/95 (AU686824).
US Office Action dated Dec. 8, 2008 issued in U.S. Appl. No. 11/118,163.
US Office Action dated Aug. 30, 2000 issued in U.S. Appl. No. 09/425,544 (6565434).
US Office Action Interview Summary dated Aug. 28, 2002 issued in U.S. Appl. No. 09/425,544 (6565434).
US Notice of Allowability and Allowable Claims dated Sep. 9, 2002 in U.S. Appl. No. 09/425,544 (6565434).
US Notice of Allowance dated Sep. 17, 2002 in U.S. Appl. No. 09/425,544 (6565434).
US Notice of Allowance dated Mar. 11, 2009 issued in U.S. Appl. No. 10/932,615.
Australian Office Action dated Feb. 22, 1996 issued in AU27192/95 (AU686824).
Australian Notice of Acceptance dated Jul. 20, 2006 issued in AU2003200581.
Australian Notice of Acceptance dated Feb. 8, 2007 issued in AU2003204730.
Australian Office Action dated Jul. 2, 1999 issued in AU24977/99.
Australian Office Action dated Jul. 2, 1999 issued in AU24978/99.
Australian Office Action dated Jul. 2, 1999 issued in AU24979/99.
Australian Office Action dated Jul. 2, 1999 issued in AU24981/99.
Australian Notice of Opposition re Aristocrat dated May 11, 1998 filed in Application No. AU 27192/95 (now Pat No. AU686824).
Australian Notice of Opposition re Mikohn dated May 12, 1998 filed in Application No. AU 27192/95 (now Pat No. AU686824).
Australian Statement of Grounds and Particulars in Support of Opposition by Aristocrat Leisure Industries dated Aug. 11, 1998 filed in Application No. AU27192/95 (now Pat No. AU686824).
Australian Statement of Grounds and Particulars in Support of Opposition by Mikohn Gaming dated Aug. 12, 1998 filed in Application No. AU27192/95 (now Pat No. AU1686824)).
Australian Decision on Opposition dated Nov. 14, 2001 issued in Application No. AU27192/95 (now Pat No. AU686824).
Australian Notice of Opposition by Aristocrat Leisure Industries dated Jan. 8, 1999 filed in Patent Acceptance No. AU697582 (App. No. AU19970048478).
Australian Statement of Grounds and Particulars in Support of Opposition by Aristocrat Leisure Industries dated Apr. 7, 1999 filed in Patent Acceptance No. AU697582 (App. No. AU19970048478).
Australian Notice of Withdrawal of Opposition by Aristocrat Leisure Industries dated Oct. 18, 1999 filed in Patent Acceptance No. AU697582 (App. No. AU19970048478).
Australian Notice of Opposition by Aristocrat Leisure Industries dated Dec. 24, 2002 filed in Patent Acceptance No. AU752636 (App. No. AU19990063152).
Australian Statement of Grounds and Particulars in Support of Opposition by Aristocrat Leisure Industries dated Mar. 24, 2003 filed in Patent Acceptance No. AU752636 (App. No. AU19990063152).
Australian Notice of Assertion of Invalidity by Aristocrat Technologies dated Oct. 5, 2007 filed in Patent Application No. AU2007201195.
Dacom 6000 - Crown Casino Project - Bonus Point Processing (Rev. C), Author C. Curry; dated Feb. 5, 1997 ; 16 pages.
Dacom 6000 - Crown Casino Project - Bonus Server Promotions (Chapter 6, Version 1.1, Rev. A), Author, Gail Shelby; dated Mar. 12, 1997; 93 pages.
Dacom 6000 - Card Packet Definitions (Rev. A), Author C. Curry; dated Jan. 23, 1997; 13 pages.
Dacom 6000 - Crown Casino C10 - FDS, Revision 2.0; Author, Turnbull; dated Mar. 14, 1996; 63 pages.
Dacom 6000 - Crown Casino C10 - FDS, Revision 2.1; Author, Turnbull; dated Mar. 14, 1996; 62 pages.
Crown Dacom 6000 Testing - Proof of Concepts Testing Outline, Version 1.4; dated Mar. 16, 1997; 15 pages.
Dacom 6000 - Work in Progress Schedule; dated Mar. 20, 1997; 3 pages.
Australian Office Action dated May. 26, 2008 issued in 2007200572.
Notice of Allowance dated Sep. 8, 2008 issued in U.S. Appl. No. 10/932,615.
US Office Action dated Sep. 19, 2008 issued in U.S. Appl. No. 11/380,879.
US Office Action dated Aug. 21, 1997 issued in U.S. Appl. No. 08/647,621 (now 5,876,284).
US Notice of Allowance dated Jun. 3, 1998 issued in U.S. Appl. No. 08/647,621 (now 5,876,284).

Exhibits in Support of CDS' Memorandum of Point and Authorities in Support of CDS' Motion for Summary Judgment of Invalidity of US Patent No. 5,836,817 (On-Sale Bar) [Filed Under Seal—Subject to Protective Order] dated Jul. 23, 1999, 319 pgs.

Expert Report of Samuel Wolff Pursuant to Federal Rule of Civil Procedure 26(a)(2) dated Feb. 15, 1999.

Expert Report of W. Alan Jorgensen Pursuant to Federal Rule of Civil Procedure 26(a)(2) (vol. III) dated Feb. 13, 1999.

IGT/ACRES P289/AC001 Flowchart dated Jun. 5, 2006, 1 pg.

IGT's Infringement Contentions filed in *IGT* v. *Bally Gaming International, Inc.* et al., Civil Action No. 06-282 (SLR), U.S. District court for the District of Delaware, filed on Apr. 28, 2006, 1 pg.

Proposed Findings of Fact in Support of CDS' Memorandum of Points and Authorities in Support of CDS' Third Motion for Summary Judgment of Invalidity of U.S. Patent No. 5,836,817 (On-Sale Bar) [Filed Under Seal—Subject to Protective Order] dated Jul. 23, 1999, 41 pgs.

US Office Action dated Jul. 14, 2008 issued in U.S. Appl. No. 10/932,615.

US Office Action dated Feb. 13, 2009 issued in U.S. Appl. No. 11/380,895.

US Office Action Final dated May 11, 2009 issued in U.S. Appl. No. 11/380,879.

Request for Inter Partes Reexamination filed by party in interest, Bally Technologies, Inc., dated Jul. 17, 2007 filed in U.S. Appl. No. 95/000,279.

Order Granting Request for Inter Partes Reexamination of USP 6,832,958 [filed by Bally Technologies, Inc.]; issued in U.S. Appl. No. 95/000,279 dated Sep. 21, 2007; 17 pgs.

Action Closing Prosecution issued in U.S. Appl. No. 95/000,279 [reexamination] on Sep. 21, 2007, 10 pgs.

Third Party Requestor [Bally Technologies, Inc.] Appeal Brief in Inter Partes Reexamination filed in U.S. Appl. No. 95/000,279 on Jul. 14, 2008, 34 pgs.

Respondent's Brief in Inter Partes Reexamination Under 37 CFR 41.68 dated Aug. 11, 2008 filed in U.S. Appl. No. 95/000,279 [reexamination], 19 pgs.

Third Party Requestor [Bally Technologies, Inc.] Appeal Brief in Inter Partes Reexamination filed in U.S. Appl. No. 95/000,279 on Apr. 1, 2009, 37 pgs.

Third Party Requestor [Bally Technologies, Inc.] *Corrected* Appeal Brief in Inter Partes Reexamination (w/attachments) filed in U.S. Appl. No. 95/000,279 on Apr. 1, 2009, 37 pgs.

Related Proceedings to Appeal Brief of Third Party Requestor [Bally Technologies, Inc.] in Inter Partes Reexamination [U.S. Appl. No. 95/000,279]: "*Plaintiff IGT's Memorandum in Support of Its Motion for a Preliminary Injunction*," U .S. District Court, Delaware, Case No. 06-282, Confidential, Filed Under Seal, dated Oct. 31, 2006, 45 pgs.

Related Proceedings to Appeal Brief of Third Party Requestor [Bally Technologies, Inc.] in Inter Partes Reexamination [U.S. Appl. No. 95/000,279]: "Declaration of Bart. A. Lewin in Support of Plaintiffs IGT's Motion for Preliminary Injunction, " U.S. District Court, Delaware, Case No. 06-282, dated Oct. 30, 2006, 42 pgs.

Related Proceedings to Appeal Brief of Third Party Requestor [Bally Technologies, Inc.] in Inter Partes Reexamination [U.S. Appl. No. 95/000,279]: "*Report & Recommendation* (*Findings of Fact* 7 *Conclusions of Law Re: Claim Construction*)," *Mikohn Gaming Corp.* v *Acres Gaming, Inc.* etc., U.S. District Court Nevada, Case No. CV-S-97-1383, dated May 24, 2000, 51 pgs.

Related Proceedings to Appeal Brief of Third Party Requestor [Bally Technologies, Inc.] in Inter Partes Reexamination [U.S. Appl. No. 95/000,279]: "*Order and Decision re Report & Recommendation* (*Findings of Fact* 7 *Conclusions of Law Re: Claim Construction*)," *Mikohn Gaming Corp.* v. *Acres Gaming, Inc.* etc., U.S. District Court Nevada, Case No. CV-S-97/1383, dated Jul. 27, 2000, 23 pgs.

Dacom 6000 - Crown Casino C10 - FDS (version 1.05) dated Jun. 11, 1995, 52 pages.

CDS Motion and Memorandum of Point and Authorities in Support of CDS' Motion for Summary Judgment of Invalidity of US Patent No. 5,836,817 (On-Sale Bar) [Filed Under Seal—Subject to Protective Order] dated Jul. 23, 1999, 19 pgs.

Acres Gaming, Inc.'s Opposition to Casino Data Systems' and Sunset Station Hotel and Casino's Motion for Summary Judgment dated Oct. 5, 1998, 25 pgs.

Acres Gaming, Inc.'s Second Supplement to its Opposition to Casino Data Systems' and Sunset Station Hotel and Casino's Motion for Summary Judgment (vol. II) dated Oct. 13, 1998, 4 pgs.

Acres Gaming, Inc.'s Supplement to its Opposition to Casino Data Systems' and Sunset Station Hotel and Casino's Motion for Summary Judgment (vol. II) dated Oct. 8, 1998, 4 pgs.

Acres Gaming, Inc.'s Third Supplement to its Opposition to Casino Data System's and Sunset Station Hotel and Casino's Motion for Summary Judgment (vol. II) dated Oct. 14, 1998, 5 pgs.

Acres Gaming's Opposition to CDS' Motion for Summary Judgment of Invalidity of U.S. Patent No. 5,752,882 (On-Sale Bar) [Filed *Under Seal*—Subject to Protective Order] dated Sep. 7, 1999, 33 pgs.

Acres Gaming's Opposition to CDS' Motion for Summary Judgment of Invalidity of US Patent No. 5,836,817 (On-Sale Bar) [Filed *Under Seal*—Subject to Protective Order] dated Aug. 18, 1999, 33 pgs.

Acres' Reponses to CDS' Proposed Findings of Fact Regarding CDS' Motion for Summary Judgment of Invalidity of U.S. Patent No. 5,752,882 (On-Sale Bar) [Filed Under Seal—Subject to Protective Order] dated Sep. 7, 1999, 12 pgs.

Acres' Response to the Proposed Findings of Fact of Casino Data Systems Regarding CDS' Motion for Summary Judgment of Invalidity (vol. II) dated Oct. 5, 1998, 13 pgs.

Acres' Responses to Proposed Findings of Fact of Casino Data Systems Regarding CDS' Motion for Summary Judgment of Invalidity of US Patent No. 5,836,817 (On-Sale Bar) [Filed Under Seal—Subject to Protective Order] dated Aug. 18, 1999, 7 pgs.

Casino Data Systems and Sunset Station Hotel & Casino's ("CDS") Motion for Summary Judgment of Invalidity of U.S. Patent No. 5,752,882 (Vol. IA) dated Sep. 17, 1998, 5 pgs.

CDS' Memorandum of Points and Authorities in Support of CDS' Motion for Summary Judgment of Invalidity of U.S. Patent No. 5,752,882 [Filed in Camera] (vol. IA) refiled pursuant to Court Order dated Jul. 22, 1999, 23 pgs.

CDS' Motion and Memorandum of Point and Authorities in Support of CDS' Motion for Summary Judgment of Invalidity of U.S. Patent No. 5,836,817 (On-Sale Bar) [Filed Under Sea—Subject to Protective Order] dated Jul. 23, 1999, 19 pgs.

CDS' Reply Memorandum in Support of CDS' Motion for Summary Judgment of Invalidity of U.S. Patent No. 5,752,882 (On-Sale Bar) [Filed Under Sea—Subject to Protective Order (vol. IA) dated Oct. 17, 1998, 21 pgs.

CDS' Reply Memorandum in Support of CDS' Motion for Summary Judgment of Invalidity of US Patent No. 5,836,817 (On-Sale Bar) [Filed Under Seal—Subject to Protective Order] dated Sep. 2, 1999, 15 pgs.

CDS' Supplemental Brief Regarding CDS' First Motion for Summary Judgment of Tnvalidity (vol. IA) dated Nov. 24, 1998, 7 pgs.

Deposition of Derell M. Johns and Exhibits 618, 619 & 620 (vol. IX) dated Nov. 10, 1999, 66 pgs.

Deposition of John F. Acres and Exhibits 706 (color copies) 709 & 715 (vol. IX) dated Nov. 9, 1999, 79 pgs.

Exhibit A of Bally's First Supplemental Responses to IGT's First Set of Interrogatories to Defendants (Nos. 1-3) filed in *IGT* v. *Bally Gaming International, Inc.*, et. al., Civil Action No. 06-282 (SLR), U.S. District Court for the District of Delaware, filed on Apr. 28, 2006, including documents dated Nov. 17, 1992 and Jul. 12, 1990, 8 pgs.

Exhibit B of Bally's First Supplemental Responses to IGT's First Set of Interrogatories to Defendants (Nos. 1-3) filed in *IGT* v. *Bally Gaming International, Inc.*, et. al., Civil Action No. 06-282 (SLR), U.S. District Court for the District of Delaware, filed on Apr. 28, 2006, 3 pgs.

Exhibit D of Bally's First Supplemental Response to IGT's First Set of Interrogatories in Defendants (Nos. 1-3) file din *IGT* v. *Bally Gaming International, Inc.*, et al., Civil Action No. 06-282 (SLR), U.S. District Court for the District of Delaware, filed on Apr. 28, 2006, 3 pgs.

Exhibits (additional) to Deposition of Disclosure, Inc. dated Feb. 25, 1999 (vol. IVB) 163 pgs.

Exhibits in Support of CDS' Memorandum of Point and Authorities in Support of CDS' Motion for Summary Judgment of Invalidity of US Patent No. 5,836,817 (On-Sale Bar) [Filed Under Seal — Subject to Protective Order] dated Jul. 23, 1999, 319 pgs.

Expert Report of Samuel Wolff Pursuant to Federal Rule of Civil Procedure 26(a)(2) dated Feb. 15, 1999.

Expert Report of W. Alan Jorgensen Pursuant to Federal Rule of Civil Procedure 26(a)(2) (vol. III) dated Feb. 13, 1999.

IGT/ACRES P289/AC001 Flowchart dated Jun. 5, 2006, 1 pg.

IGT's Infringement Contentions filed in *IGT* v. *Bally Gaming International, Inc.* et al., Civil Action No. 06-282 (SLR), U.S. District court for the District of Delaware, filed on Apr. 28, 2006, 1 pg.

Proposed Findings of Fact in Support of CDS' Memorandum of Points and Authorities in Support of CDS' Third Motion for Summary Judgment of Invalidity of U.S. Patent No. 5,836,817 (On-Sale Bar) [Filed Under Seal—Subject to Protective Order] dated Jul. 23, 1999, 41 pgs.

* cited by examiner

METHOD AND APPARATUS FOR CONTROLLING THE COST OF PLAYING AN ELECTRONIC GAMING DEVICE

RELATED APPLICATION DATA

This application is a continuation of application Ser. No. 09/086,964, filed May 29, 1998, now U.S. Pat. No. 6,254,483, which is a continuation-in-part of application Ser. No. 08/465,717, filed Jun. 6, 1995, now U.S. Pat. No. 5,836,817, which is a divisional of application Ser. No. 08/322,172, filed Oct. 12, 1994, now U.S. Pat. No. 5,655,961.

BACKGROUND OF THE INVENTION

1. Field of the Invention

The present invention relates to electronic gaming machines interconnected by a computer network and more particularly to a method of configuring such machines.

2. Description of the Related Art

Casinos typically include electronic gaming machines (EGMs) such as slot machines and video poker machines. The slot machines usually includes three reels that each have a plurality of symbols printed thereon. After the player applies a wager to the machine, he or she starts play by triggering a switch that starts the reels spinning. Each reel stops at a random position and thereby presents three symbols—one from each reel. Some combinations of symbols do not pay any jackpot. Others pay varying amounts according to predetermined combinations that appear in a pay table displayed on the machine.

Video poker machines include a video monitor upon which the images of cards appear, as if dealt by a dealer from a shuffled deck, in response to player inputs to the machine. The player wins jackpots dependent upon the amount wagered and in accordance with the cards that are dealt.

When a new EGM, whether a slot or poker machine, is made available for gaming, it must first be configured. A programmable read only memory (PROM) is installed in each new EGM. The PROM includes data that controls the behavior of the machine, and typically also includes data that establishes the payback percentage, such data being referred to herein as the paytable. The paytable defines the average percentage of wagers that is returned to the players in the form of jackpots over time. Gaming regulations in many jurisdictions require the paytable to be stored in the PROM. The PROM must consequently be changed if the casino desires to change the paytable. Some jurisdictions, however, permit the casino to change the paytable by setting options at each EGM. Such options are selected by using a key switch at each machine that places the machine into a configuration mode. When in this mode, the casino employee configures the machine for such things as the maximum jackpot that can be paid by the machine before a hand payment is required. The rate at which the jackpot meter increments may also be selected as well as special effects generated by the machine in response to a jackpot. And if the jurisdiction permits, the paytable may be changed when the machine is in the configuration mode. Otherwise, the only way to change the paytable is to replace the PROM with another containing a different paytable.

Poker machines, when placed in a configuration mode as described above, display information about the status of the various options on the video monitor that is used to display the cards and other information when the game is played. On the poker machine, sound, background color, and card decoration, which may be configured to display the casino's logo, are examples of the parameters that can be changed when the machine is in the configuration mode. It is easier to configure the poker machine because the monitor displays the status of various options as well as lists of options, from which a parameter can be selected and implemented. Slot machines, on the other hand, do not have a monitor and are therefore difficult to configure because the only displays available to indicate status are four-digit alphanumeric readouts that are used to display the amounts on the credit meter or the jackpot meter. Configuring a slot machine as described above can take about twenty to thirty minutes of casino time. Installing machines in a new casino, which may number in the thousands, or changing the parameters on preexisting machines, is consequently a very labor intensive process.

It is also a process that lends itself to implementing, either inadvertently or otherwise, the wrong parameters. Thus, a group of machines that are supposed to be configured identically may include one or more that vary from one another because of an incorrect input during the configuration process.

Some EGMs include a primary game and a secondary game. For example, the primary game may include a slot machine that periodically permits the player to play the secondary game before the next reel spin on the slot machine. Some secondary games award a prize after the player spins a wheel. The prize is indicated on a sector of the wheel, which stops at a random location after being spun. Because the secondary game must be configured in the same manner as the primary game, the same types of disadvantages are associated with secondary games.

In addition, some EGMs include a dedicated progressive in which a percentage of all wagers made on that machine goes into a separate pool that is awarded by the machine. The payback percentage for such a game must also be configured, either by the casino or via a paytable included in a PROM, and therefore presents similar problems.

It would be desirable for a casino operating a plurality of EGMs to be able to change the effective wager per unit time required of a player of the machines. The wager per unit time, which is the cost to the player for playing the EGMs, is a function of the payback percentage and the game speed. The faster the game speed and the lower the payback percentage, the more money the casino retains, and vice versa. Increasing the wager per unit time increases casino revenues—up to a point. If the casino simply selects a very low payback percentage (or a very fast game speed) on all of its machines, the players may feel that they get better returns elsewhere. It would, however, be desirable for the casino to be able to vary the wager per unit time in accordance with the demand on the casino floor. In other words, during evenings and into the early morning hours on weekends—and especially on certain holidays—there are greater numbers of players placing wagers than, e.g., on a Tuesday morning between 7:00 am and noon. It would therefore be desirable for the casino to set the cost to the player at a higher level during high demand periods and at a lower level, to attract players, during low demand periods.

It would be quite cumbersome to change payback percentage, either by switching the PROMs from machines, or by placing the machine in a configuration mode in jurisdictions that permit changing pay tables in response to casino configuration. Changing game speed by switching PROMs or by placing the machine in a configuration mode would be equally cumbersome. It would be impractical to make such changes in a large casino even weekly, much less daily.

In addition to varying the cost to the players, i.e., the wager per unit time, in response to periods of high and low demand in the casino, it would be desirable to change the player cost in response to the status of a particular player. The casino likes to track players to identify big players and to conduct direct mail marketing. Casino management therefore encourages players to sign up for, receive, and use a player tracking card, which the player inserts into a card reader associated with each EGM. The casino can therefore identify players based on previous or current rates of play and vary the wager per unit time for that player accordingly.

It might also be desirable to change the cost to the player depending upon their status as a person that the casino would like to encourage to play their games or as the companion of such a person or of a person known to wager large amounts. Changing player cost in response to player status by switching PROMs or reconfiguring the machines is not possible.

In addition to the foregoing it would be desirable to change the manner in which the player perceives the EGM. In other words, it would be desirable to change the sound effects and appearance of the machine in response to time, the rate at which the interconnected machines are played, or the status of a player.

SUMMARY OF THE INVENTION

The present invention comprises a method of configuring electronic gaming machines interconnected by a computer network to a host computer. Selected configuration parameters are implemented at each machine. A plurality of variables related to play on the gaming machines are monitored. A predetermined criterion for one of the variables is established. After play is permitted to occur at the machines, one of the machines is selected when the established criterion is met. The configuration parameter of the selected machine is changed in responsive to a computer command.

The present invention overcomes the disadvantages with associated with the prior art and provides additional advantages that are apparent when the detailed description is read in view of the accompanying drawings.

DETAILED DESCRIPTION OF THE PREFERRED EMBODIMENT

Figure 1:
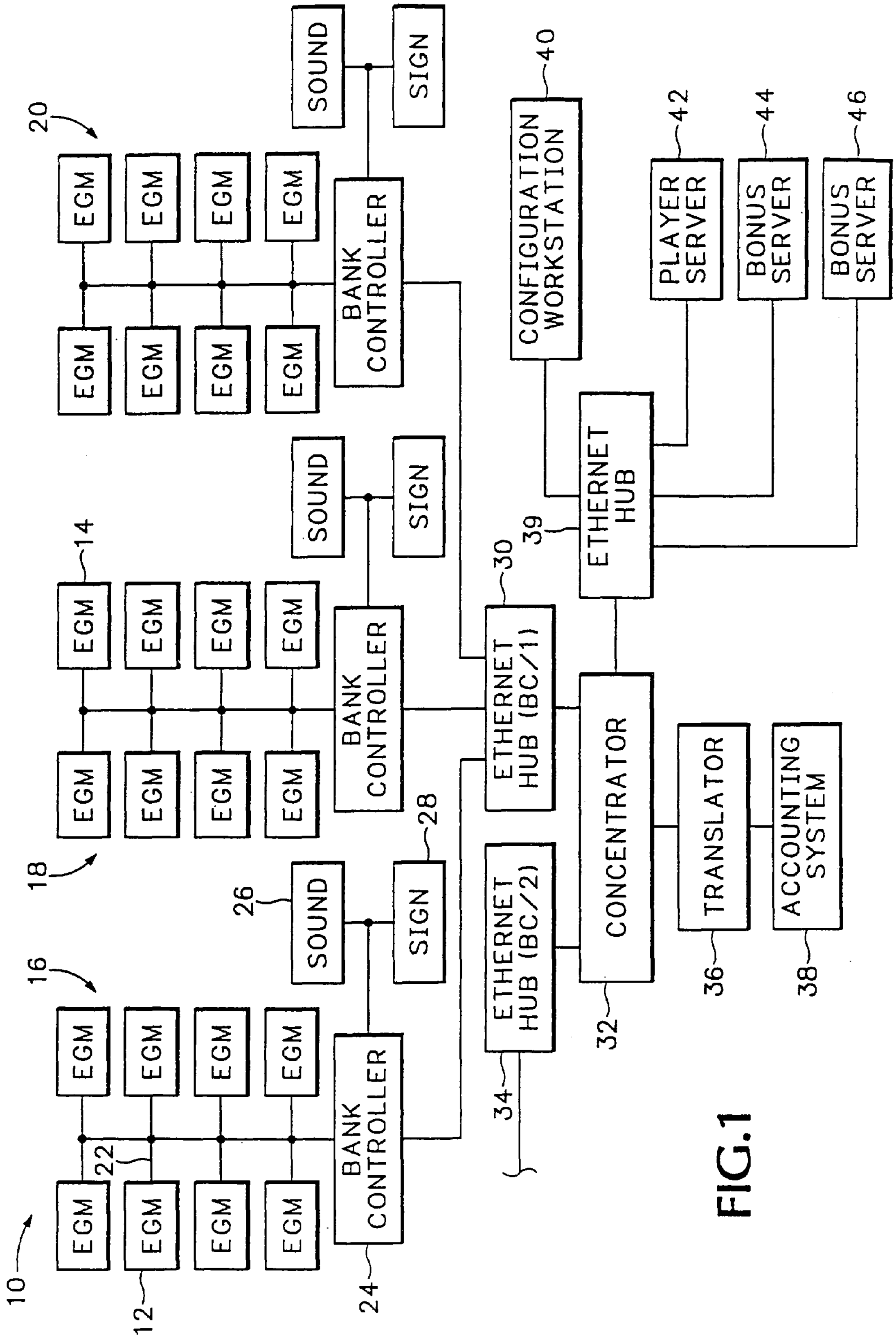
FIG. 1 is a schematic diagram of a plurality of electronic gaming machines interconnected by a computer network to a host computer in accordance with the present invention.

Turning now to FIG. 1, indicated generally at 10 is a schematic diagram illustrating electronic gaming machines (EGMs), like EGMs 12, 14, interconnected by a computer network. Included therein are three banks, indicated generally at 16, 18, 20, of EGMs. Each EGM is connected via a network connection, like connection 22, to a bank controller 24. In the present embodiment of the invention, each bank controller comprises a processor that facilitates data communication between the EGMs in its associated bank and the other components on the network. The bank controller also includes a CD ROM drive for transmitting digitized sound effects, such as music and the like, to a speaker 26 responsive to commands issued over the network to bank controller 24. The bank controller is also connected to an electronic sign 28 that displays information, such as jackpot amounts and the like, visible to players of machines on bank 16. Such displays are generated and changed responsive to commands issued over the network to bank controller 24. Each of the other banks 18, 20 of EGMs include associated bank controllers, speakers, and signs as shown, which operate in substantially the same manner.

Ethernet hub 30 connects each of the bank controllers associated with banks 16, 18, 20 of EGMs to a concentrator 32. Another Ethernet hub 34 connects similar bank controllers (not shown), each associated with an additional bank of EGMs (also not shown), to concentrator 32. The concentrator functions as a data control switch to route data from each of the banks to a translator 36. The translator comprises a compatibility buffer between the concentrator and a proprietary accounting system 38. It functions to place all the data gathered from each of the bank controllers into a format compatible with accounting system 38. The present embodiment of the invention, translator 38 comprises an Intel Pentium 200 MHz Processor operating Microsoft Windows NT 4.0.

Another Ethernet hub 39 is connected to a configuration workstation 40, a player server 42, and to bonus servers 44, 46. Hub 39 facilitates data flow to or from workstation 40 and servers 42, 44, 46.

The configuration workstation 40 comprises a user interface. It comprises a personal computer including a keyboard, Intel Pentium Processor and Ethernet card.

The player server 42 comprises a microcomputer that is used to control messages that appear on displays associated with each EGM. Player server 42 includes an Intel Pentium Processor and an Ethernet card.

Bonus servers 44, 46 each comprise a microcomputer used to control bonus applications on the network. Each bonus application comprises a set of rules for awarding jackpots in excess of those established by the pay tables on each EGM. For example, some bonus awards may be made randomly, while others may be made to link to groups of EGMs operating in a progressive jackpot mode. Examples of bonuses that can be implemented on the network are disclosed in co-pending application Ser. No. 08/843,411, filed Apr. 15, 1997 and assigned to the Assignee of the present application (the '411 application), which is incorporated herein by reference for all purposes. This co-pending application also describes in more detail features of the network, like that shown in FIG. 1, that may be used to implement the present invention. Also incorporated herein by reference for all purposes is U.S. Pat. No. 5,655,961, assigned to the Assignee of the present application (the '961 patent), which also discloses bonuses that can be implemented by bonus servers 44, 46 and a network that could be used to implement the present invention.

Figure 2:
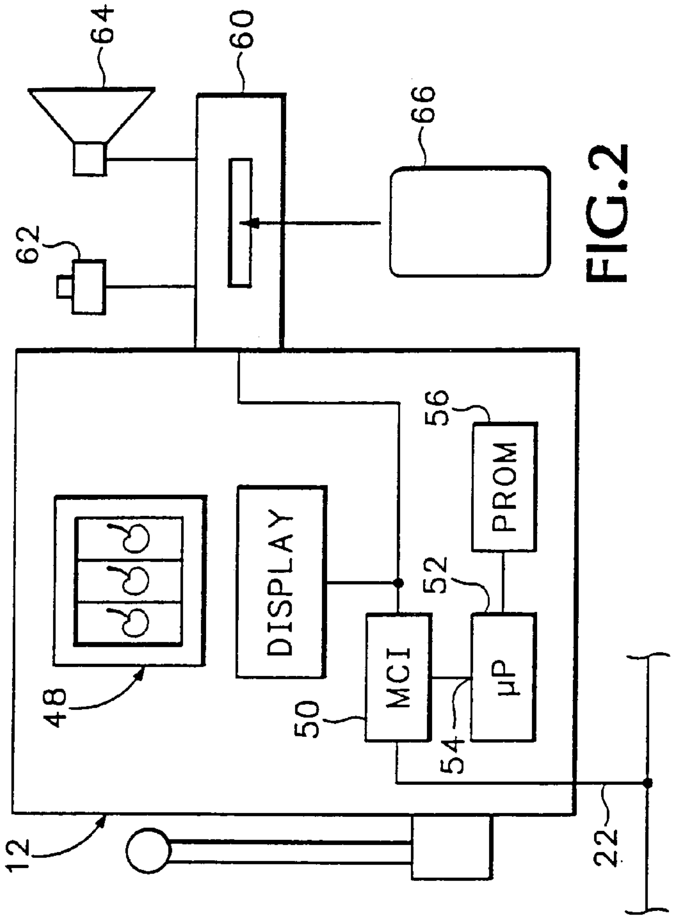
FIG. 2 is a schematic diagram of a slot machine and associated hardware implemented in accordance with the present invention.

FIG. 2 is a highly schematic representation of an electronic slot machine, which is typical of each of the machines in the network, that incorporates network communications hardware as described hereinafter. This hardware is described in the '961 patent, and is referred to therein as a data communications node. Preferably the network communications hardware is like that disclosed in the '411 application, which is referred to therein as a machine communication interface.

Figure 6:
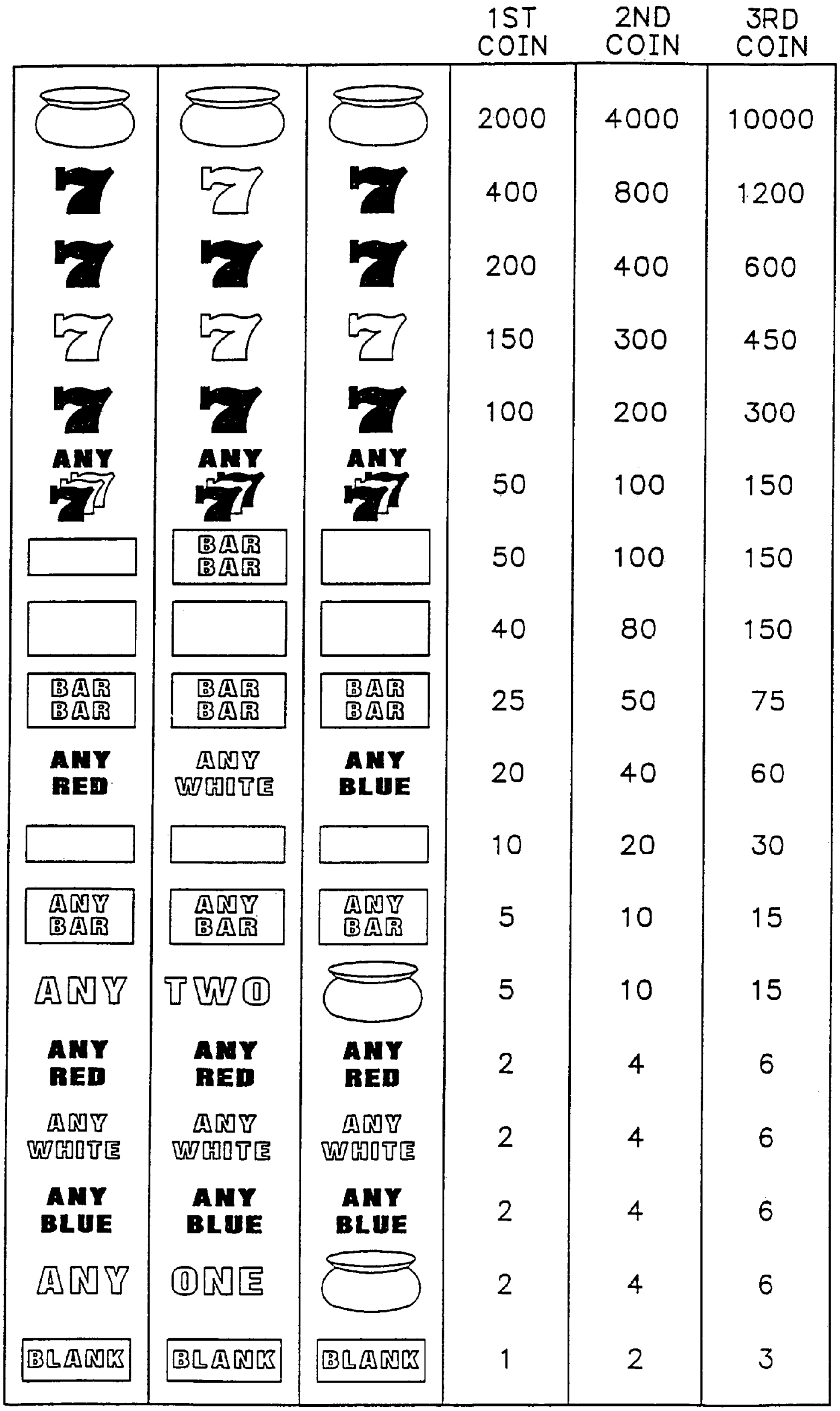
FIG. 6 is a paytable for an electronic gaming machine.

Included in EGM 12 are three reels, indicated generally at 48. Each reel includes a plurality of different symbols thereon. The reels spin in response to player input after a wager is made. FIG. 6 comprises the paytable for EGM 12. The first three columns depict different combinations of symbols on the reels. The fourth column of FIG. 6 indicates the amount won on a single coin wager when the combination of symbols in the first three columns appears after the reels spin. Columns five and six indicate the amount won when two and three coins, respectively, are wagered. Any combination of reel symbols other than those shown in FIG. 6 does not result in a payment to the player.

The network communications hardware preferably comprises a machine communication interface (MCI) 50 as set forth in the '411 application. MCI 50 facilitates communication between the network, via connection 22, and microprocessor 52, which controls the operation of EGM 12. This communication occurs via a serial port 54 on the microprocessor to which MCI 50 is connected. Microprocessor 52 is also connected to a programmable read only memory (PROM) 56, which controls the behavior of EGM 12, and which may or may not include the paytable of FIG. 6, depending upon how the present invention is implemented, as described hereinafter. MCI 50 may include a random access memory (RAM), which can be used as later described herein.

MCI 50 also facilitates communication between the network and a player display 58, a card reader 60, a player-actuated push button 62, and a speaker 64.

Card reader 60 reads a player-tracking card 66 that is issued by the casino to individual players who choose to have such a card. Card reader 60 and player-tracking card 66 are known in the art, as are player-tracking systems, examples being disclosed in the '961 patent and '411 application. Briefly summarizing such a system, a player registers with the casino prior to commencing gaming. The casino issues a unique player-tracking card to the player and opens a corresponding player account that is stored on accounting system 38 (in FIG. 1). The account includes the player's name and mailing address and perhaps other information of interest to the casino in connection with marketing efforts. Prior to playing one of the EGMs in FIG. 1, the player inserts card 66 into reader 60 thus permitting accounting system 38 to track player activity, such as amounts wagered and won and rate of play.

In another embodiment of the invention, EGM 12 in FIG. 2 can be operated in a stand-alone mode, i.e., without connection 22.

Consideration will now be given to the operation of the network and associated equipment depicted in FIGS. 1 and 2. First, selected configuration parameters are implemented at each EGM. As discussed above, these configuration parameters may be implemented by either (a) installing a PROM, like PROM 56 in FIG. 2, in each EGM to be configured or (b) by placing the EGM in a configuration mode and thereafter generating inputs to the EGM, or a combination of (a) and (b). Alternatively, and also in accordance with the present invention, configuration parameters can be implemented by generating computer commands at configuration workstation 40 that are transmitted via the network to a selected one or more of the EGMs. For example, and with reference to FIG. 2, such commands can be transmitted over the network to MCI 50 via connection 22. The commands may either reside in the random access memory (RAM) contained within MCI 50, or can be transferred to RAM (not shown) associated with EGM 12 via the serial port 54 of microprocessor 52. In the latter case, the code so transferred is received by microprocessor 52 and then stored in the EGM RAM.

In either case, whether stored in MCI 50 or in RAM associated with the EGM, the configuration parameters are accessible by microprocessor 52, which when programmed with the stored configuration parameters causes EGM 12 to operate in accordance with the parameters. As mentioned above, such configuration parameters control the behavior of the electronic gaming machine and may include the paytable that controls the average percent of money that the machines returns to players via jackpots.

Next, a plurality of variables related to play on the gaming machines are monitored. Such variables may include the rate at which the interconnected machines are played. The casino is therefore able to determine whether or not there is a relatively high level of demand for play or a relatively low level, i.e., the rate is relatively low. The casino's income, of course, increases with the rate of play.

Another variable comprises the time that the interconnected machines are played. The time variable may relate to a specific time of the day, the week, or the year. Each of these time periods includes portions in which play typically occurs at a high rate, e.g., evenings, Friday and Saturday nights, and three day weekends, and other portions in which play typically occurs at a low rate. The time variable may also relate to the length of time a particular configuration parameter has been implemented.

Still another such variable comprises the status of a player of one of the machines. The status of the player may comprise whether the player is recognized by a player-tracking system operated on the network. In the present embodiment of the invention this feature is implemented with player-tracking card 66 and card reader 60. Another aspect of the player status relates to the level of player play. One aspect of the level of player play includes the rate of play—both the current rate as well as the rate over a selected time period.

Next, a predetermined criterion is established for one of the monitored variables. For example, in connection with the player status, the predetermined criterion may comprise a predetermined level of player play, e.g., establishing a predetermined rate of player play. Another predetermined criterion relates to the level of money wagered on the entire system shown in FIG. 1, which is calculated by accounting system 38. This criterion could comprise the rate of money wagered on the entire system, as opposed to the criterion set forth above relating to the rate at which a single player wagers.

Another predetermined criterion may relate to the time. As noted above this could be the time that a particular configuration parameter has been implemented or could relate to the time of a day, week, or year.

After the predetermined criterion for one of the monitored variables is established, play is permitted to occur at the machines. When the monitored variable meets the criterion, one or more of the machines, or all, in FIG. 1 is selected, and a computer command is issued. In response to the computer command, a configuration parameter of the selected machine or machines is changed responsive to a command over the network.

Figure 3:
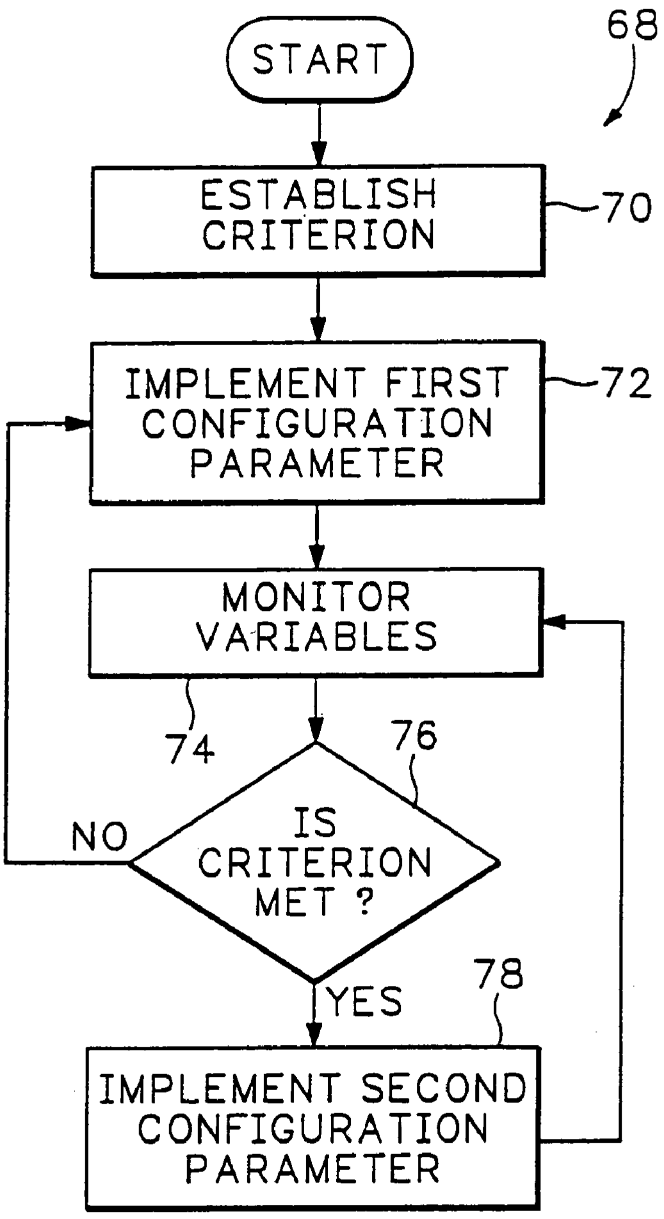
FIG. 3 is a flow chart that depicts operation of the FIG. 1 network in accordance with the present invention.

Attention is now directed to FIG. 3 wherein indicated generally at 68 is flow chart of a computer program implementing a portion of a preferred embodiment of the present invention. Computer program 68 is implemented in software installed on configuration workstation 40 in FIG. 1. First, a criterion is established in box 70. As discussed above, the criterion may relate to the rate at which the interconnected machines are played, the time the interconnected machines are played, or the status of a player of one of the machines. Next, a first configuration parameter is implemented in box 72. As discussed above, configuration parameters are implemented by installing a PROM provided by the EGM manufacturer, by generating inputs to the EGM when placed in the configuration mode, or by downloading configuration data delivered over the network of FIG. 1 to the EGM, or by a combination of the foregoing. Typically there is an initial configuration implemented via PROM or placing the EGM into a configuration mode. Implementation of initial configuration parameters, however, may be accomplished in any manner in accordance with the present invention.

In box 74, variables such as rate at which the machines are played, time that the machines are played, and the status of players, are monitored using the network of FIG. 1. In step 76 the program compares the monitored variables with the criterion established in block 70. If it is not met, the program maintains the first configuration parameter implemented in step 72 and continues to monitor variables in 74.

When step 76 determines that the criterion is met, a second configuration parameter is implemented in box 78. Thereafter the program monitors system variables in box 74 and so long as the criterion is met, maintains implementation of the second configuration parameter. When and if the criterion is not met, step 76 directs that the first configuration parameter be again implemented in box 72 with continued monitoring and comparison as before.

Considering now FIGS. 4 and 5, additional description will be made of examples of configuring electronic gaming machines in accordance with the present invention in which the predetermined criterion comprises the time that the interconnected machines are played and the changed configuration parameter comprises payback percentage.

Figure 4:
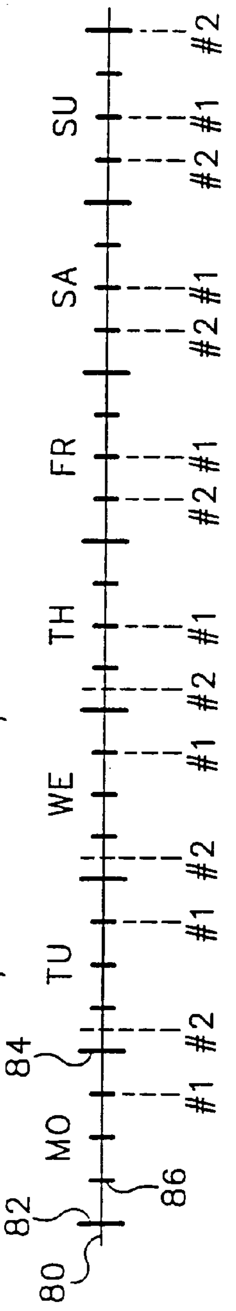
FIG. 4 is a exemplary time line for a one week period that shows changes in the player cost per unit time in response to the time of day.

In a first example, illustrated schematically in FIG. 4, the time that the interconnected machines are played relates to the time of an exemplary week. A time line 80 is bisected by long vertical lines, like lines 82, 84, which define a single 24 hour day. Each day of the week beginning with Monday and ending with Sunday, is identified on the time line. Each day is bisected by three short vertical lines, like line 86, that are equally spaced between long lines, like lines 82, 84. The distance from one short line to the next adjacent line therefore represents a 6 hour period. In the portion of time line 80 representing Monday, the short line corresponding to 6:00 pm is identified with a # 1, as are the portions of the time line representing Tuesday and Wednesday. In the portion of the time line representing Tuesday, the time corresponding to 2:00 am is designated with a #2. This is also the case for Wednesday and Thursday.

Friday, Saturday, and Sunday similarly include times corresponding to numerals 1 or 2 as depicted.

In the example of FIG. 4, the time period defined between each number 1 and the following number 2 is referred to herein as a first time period. The time period between each number 2 and the following number 1 is referred to herein as a second time period. In this example, play on the machines is typically at a high level during the first time period and typically at a low level during the second time period. During the hours of the day, especially weekdays between around breakfast and midafternoon, play in some casinos is typically at a lower level than in the evening beginning around 6:00 pm. Similarly, play on the weekends during the day is at higher level than during weekdays.

The hours of the day defining the first and second periods in FIG. 4 are entered into configuration workstation 40. A computer command is issued at the start of each period. In response to the command, a payback percentage for one, or more, of the EGMs is implemented. In accordance with the present invention, this payback percentage may be implemented by delivering over the network to each affected machine a code that is stored in a memory associated with the machine and that changes the pay table of the machine. Because some jurisdictions would not permit changing the pay table on the machine, there is an alternative way to change the payback percentage to a selected machine or machines.

Using the alternative way, the network tracks the amount of money played on a selected gaming machine or machines that will have different payback percentages implemented. Responsive to the first command, a predetermined percentage of the money played on the selected machines is allocated to a bonus pool that is also tracked by the network. A bonus period is also initiated responsive to the first command. During the first period a bonus is paid to the machine or machines on which the first payback percentage is implemented. Such a bonus may be randomly awarded to one of these machines or may comprise an additional payment each time an EGM jackpot is paid in accordance with the first table. Such bonuses and the manner of implementing are described in the '961 patent. After play occurs on the machines, a second computer command is issued at the start of the second period. The second payback percentage for the selected machine or machines is implemented responsive to the second command. In this example, implementation of the second period is equivalent to turning the bonus off, i.e., money is no longer allocated to a bonus period during the second period and bonuses are not paid from the pool.

It can be seen that multiple criteria can be monitored. For example, at all times it might be desirable to provide a higher payback percentage to a player who uses a player-tracking card issued to him or her by the casino. For example, the bonus pool could always be accruing, and paying bonuses to each player using a valid player's card. Such a player would be eligible for still a higher level of bonus, i.e., additional percentage would accrue from all amounts wagered during the first period on the time line. Multiple and overlapping bonus pools could therefore be simultaneously accruing a percentage of wagers, and awarding bonuses from such pools, depending upon the rate of machine play, players status, and the time the interconnected machines are played.

Figure 5:
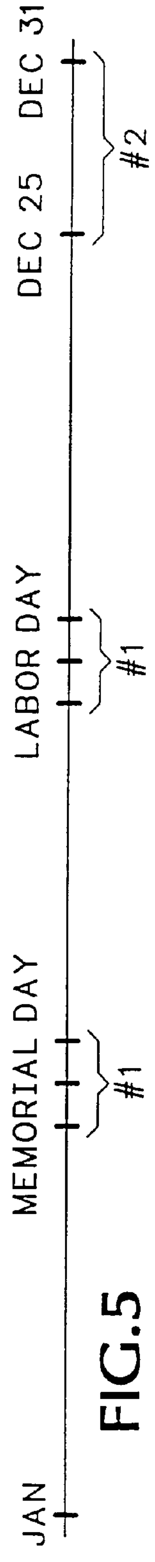
FIG. 5 is a exemplary time line for a one year period that shows changes in the player cost per unit time in response to the day of the year.

Turning now to FIG. 5, a second time line defines a year. With certain holidays, for example Memorial Day and Labor Day, play is typically high at all times throughout the three day weekend, with each day being represented by a vertical line in FIG. 5. The appropriate computer in FIG. 1 is therefore programmed to either override or alter the amount of the payback percentage change in the first and second periods of FIG. 4 during those weekends. In the example of FIG. 5, the period between December 25th and December 31st is traditionally a very slow time in some casinos so that the payback percentage could be correspondingly altered by either changing the amounts that would normally occur as a result of the parameters in FIG. 4 or substituting a different single one or multiple parameters for that period. It is to be appreciated that multiple variables may be monitored and multiple configuration parameters may be changed in response to the monitored variables.

Another configuration parameter comprises game speed. With respect to an electronic slot machine, the game speed is the time it takes from start of reel rotation until the reels stop spinning. With respect to electronic poker, the time relates to how fast the cards are "dealt," i.e., how rapidly they appear on the video monitor display. As discussed above, game speed, along with payback percentage and accrual of wagers in a bonus pool influence the net cost to the player per unit time for playing the casino games. Game speed is therefore one of the configuration parameters that may be changed in response to commands issued over the computer network in response to a predetermined criterion for one of the monitored variables. As with each of the other configurable parameters, an appropriate code input to the EGM serial port 54, delivered over the network and MCI 50, is used to change the game speed of the selected EGM.

Consideration will now be given to the operation of EGM 12 in stand-alone mode, i.e., with being connected to a network via connection 22. Initial configuration parameters are implemented as described above, either via installing PROM, by casino configuration, or by a combination of the two. In this embodiment, the RAM in MCI 50 is programmed to monitor variables related to play on the gaming machine, such as coin in, coin out, player status, time that machine is played, etc. The MCI also allocates a predetermined percentage of the money played on the gaming machine to a bonus pool. A predetermined criterion for one of the variables is stored in the MCI RAM. The MCI compares the monitored variable to the criterion and initiates a bonus period when the criterion is met. During the bonus period, the machine pays both from the pay table and from the bonus pool based on bonus rules that are stored in the MCI and implemented via communication with EGM processor 52. The bonus rules could provide for numerous types of payments via the EGM. The bonus could pay, for example, a specified amount from the pool in response to certain winning, or nonwinning, reel combinations. It could pay a multiple of any jackpot awarded by the EGM, or it could pay on a random basis. Numerous other rules could be established for paying from the bonus pool during a bonus period. As described above in connection with the networked implementation of the invention, this raises the payback percentage to a player of the gaming machine.

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

I claim:

1. A method of operating electronic gaming machines interconnected by a computer network to a host computer comprising:

permitting play to occur at the machines;

operating a player-tracking system on the network;

monitoring the level of play of a player on multiple gaming machines, wherein the level of play includes at least one of an amount wagered, an amount won, time of play, player status, level of play and a rate of play;

transmitting data relating to the monitored level over the network;

storing the data on a computer connected to the network;

selecting a machine being played by the player;

determining a bonus based on the monitored level; and paying the bonus to the player via the selected machine.

2. The method of claim 1 wherein said method further comprises issuing a computer command from the host computer.

3. The method of claim 2 wherein paying the bonus to the player via the selected machine comprises paying the bonus to the player via the selected machine responsive to the computer command.

4. The method of claim 1 wherein said method further comprises implementing a pay table in each machine and wherein said bonus is independent of any payment to the player resulting from the pay table.

5. A method of configuring electronic gaming machines interconnected by a computer network to a host computer comprising:

implementing selected configuration parameters at each machine;

permitting play to occur at the machines;

operating a player-tracking system on the network;

monitoring the level of play of a tracked player on multiple gaming machines wherein the level of play includes at least one of an amount wagered, an amount won, time of play, player status, level of play and a rate of play;

transmitting data relating to the monitored level over the network;

storing the data on a computer connected to the network;

selecting a machine being played by the player;

generating a computer message based on the monitored level;

issuing the message from the host computer; and changing a configuration parameter of the selected machine responsive to the message.

6. The method of claim 5 wherein the changed configuration parameter comprises game speed.

7. The method of claim 5 wherein the changed configuration parameter comprises payback percentage.

8. The method of claim 5 wherein changing the configuration parameter comprises paying a bonus to the player.

9. The method of claim 5 wherein the changed configuration parameter comprises game appearance.

* * * * *